United States Patent
Kokojima

(10) Patent No.: US 9,064,340 B2
(45) Date of Patent: Jun. 23, 2015

(54) DRAWING APPARATUS, DRAWING METHOD, AND DRAWING PROGRAM

(75) Inventor: Yoshiyuki Kokojima, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 665 days.

(21) Appl. No.: 13/235,635

(22) Filed: Sep. 19, 2011

(65) Prior Publication Data
US 2012/0249569 A1 Oct. 4, 2012

(30) Foreign Application Priority Data
Mar. 31, 2011 (JP) ................. P2011-080233

(51) Int. Cl.
G06T 11/20 (2006.01)
G06T 11/00 (2006.01)
G09G 5/00 (2006.01)

(52) U.S. Cl.
CPC .................. *G06T 11/203* (2013.01)

(58) Field of Classification Search
CPC ....... G06T 11/203; G06T 11/20; G06T 11/40; G06T 17/30
See application file for complete search history.

(56) References Cited

U.S. PATENT DOCUMENTS

| | | | |
|---|---|---|---|
| 2007/0211061 A1 | 9/2007 | Kokojima | |
| 2007/0263926 A1 | 11/2007 | Kokojima | |
| 2009/0309898 A1 | 12/2009 | Nakamura et al. | |
| 2011/0285743 A1* | 11/2011 | Kilgard | 345/592 |
| 2012/0019539 A1 | 1/2012 | Kokojima | |
| 2012/0069037 A1* | 3/2012 | Ziemski | 345/586 |

FOREIGN PATENT DOCUMENTS

| | | |
|---|---|---|
| JP | 2006-106705 | 4/2006 |
| JP | 2007-241878 | 9/2007 |
| JP | 2007-304871 | 11/2007 |

* cited by examiner

*Primary Examiner* — Tize Ma
(74) *Attorney, Agent, or Firm* — Amin, Turocy & Watson, LLP

(57) ABSTRACT

A drawing apparatus includes a segment setter configured to analyze outline data and to set a straight line segment for drawing a straight line portion and a curved line segment for drawing a curved line portion, in the outline data; a first stencil generator configured to generate stencil data of the straight line segment; a second stencil generator configured to obtain a basic texture in which transparency is allocated for each of a plurality of regions in an image, pasting a portion of the basic texture to the curved line segment in accordance with a shape of the curved line segment, and thereafter to generate stencil data of the curved line segment; and a drawer configured to draw a character image corresponding to the outline data, based on the stencil data of the straight line segment and the stencil data of the curved line segment.

18 Claims, 27 Drawing Sheets

POLYGON OF OUTER PERIPHERY

POLYGON OF INNER PERIPHERY

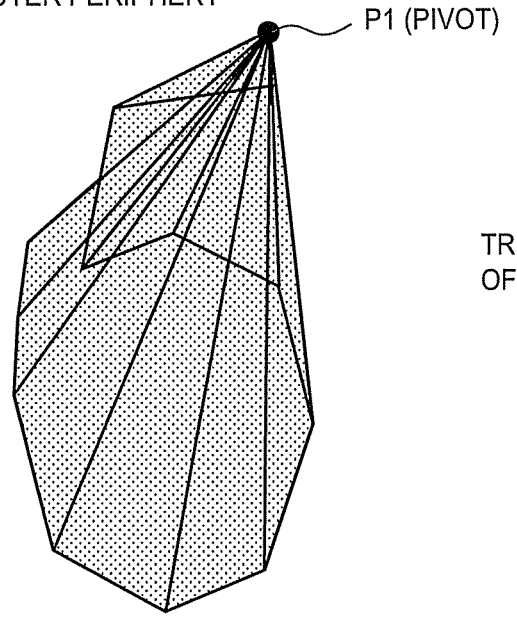
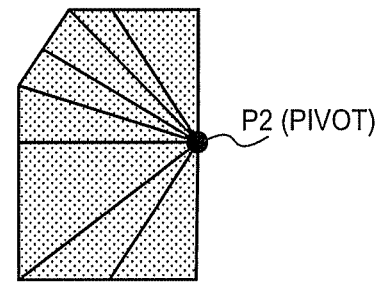
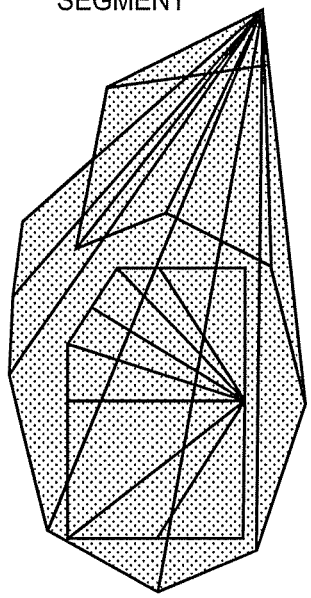
FIG. 6A
FIG. 6B
FIG. 6C

RECESSED CURVED LINE CONTOUR

PROTRUDING CURVED LINE CONTOUR

CURVED LINE SEGMENTS

STRAIGHT LINE SEGMENTS

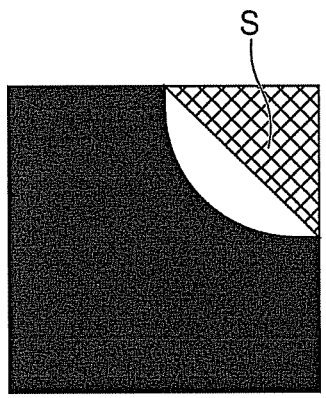
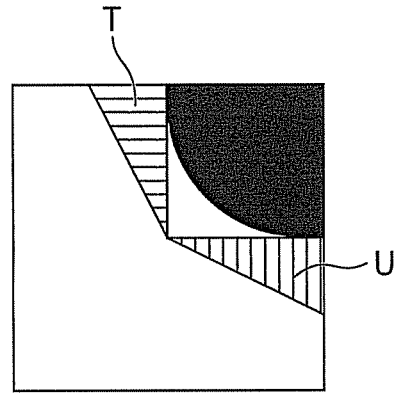
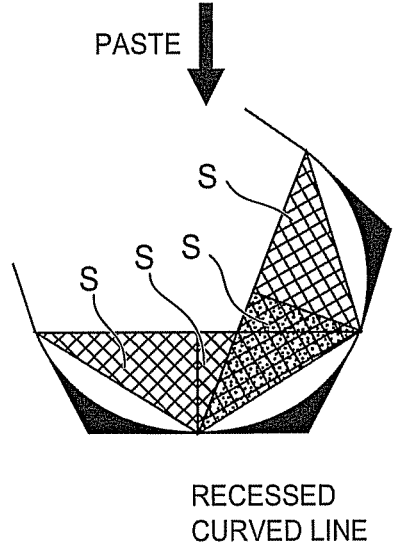
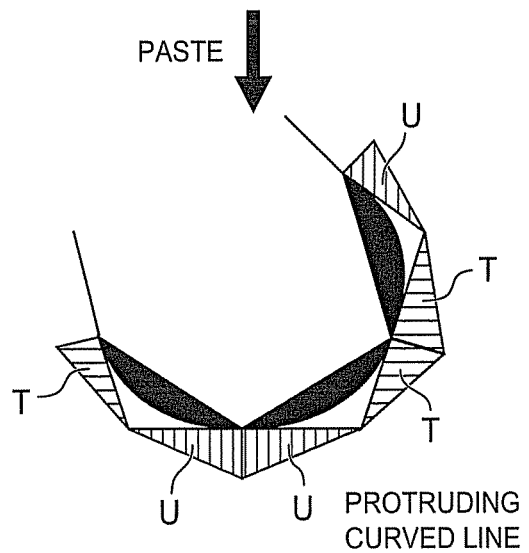
FIG. 16A      FIG. 16B

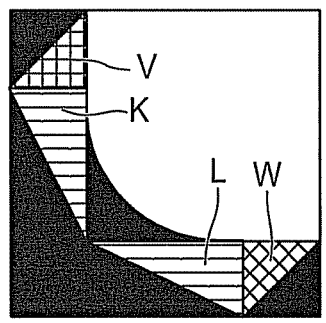
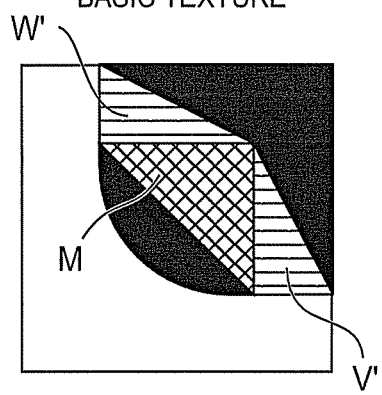
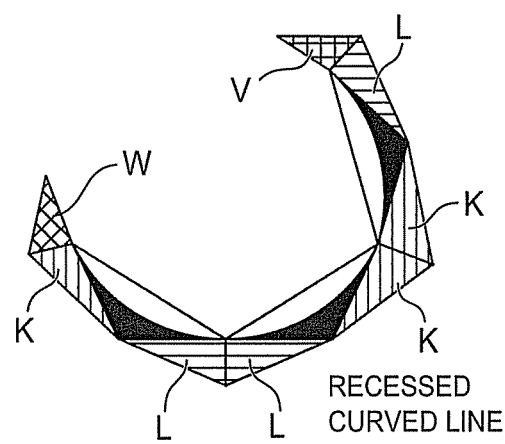
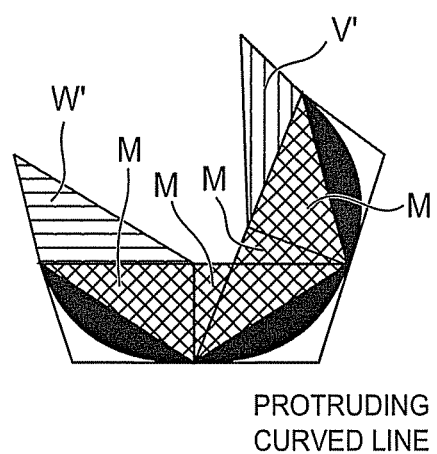
FIG. 22A  FIG. 22B

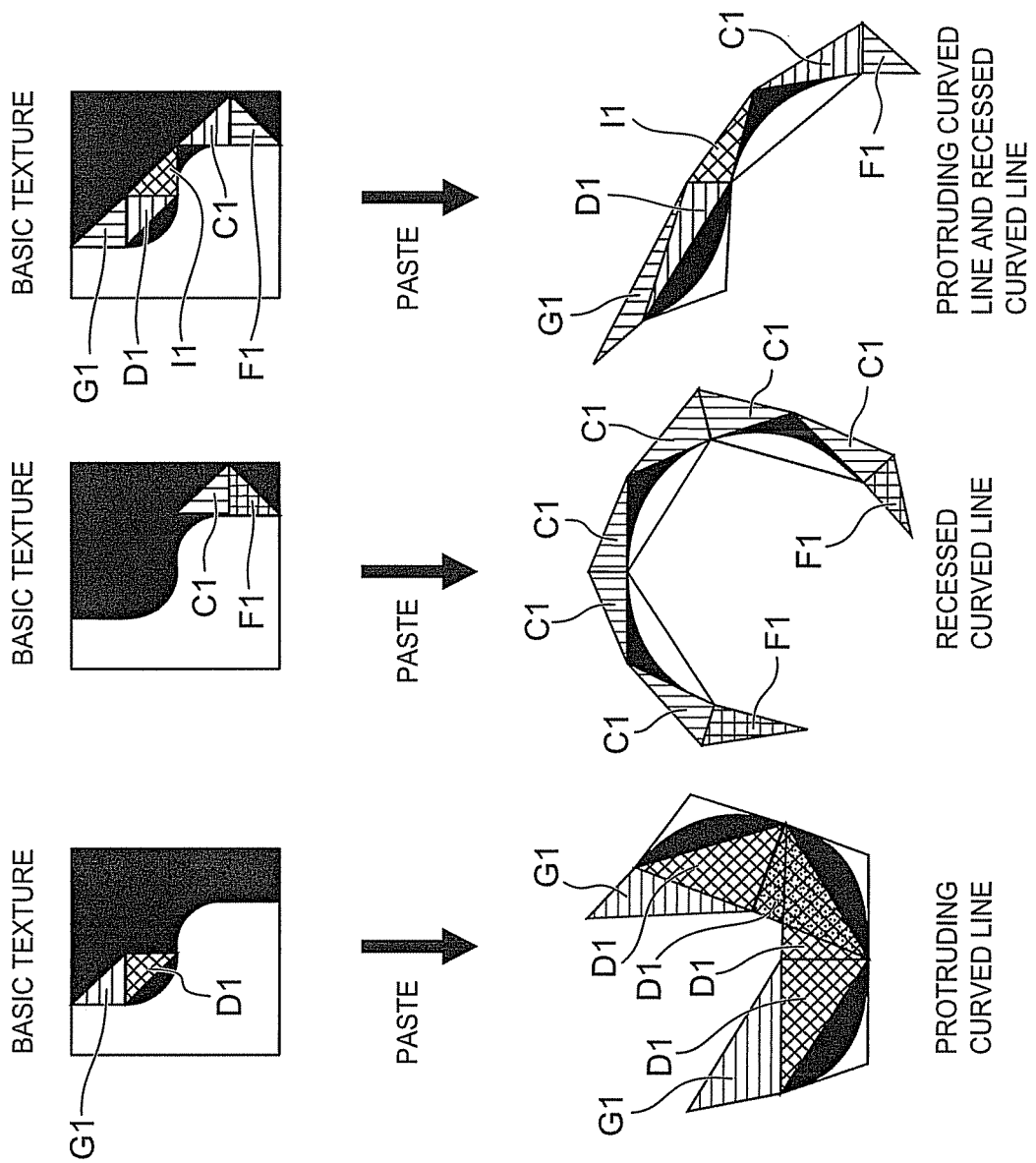

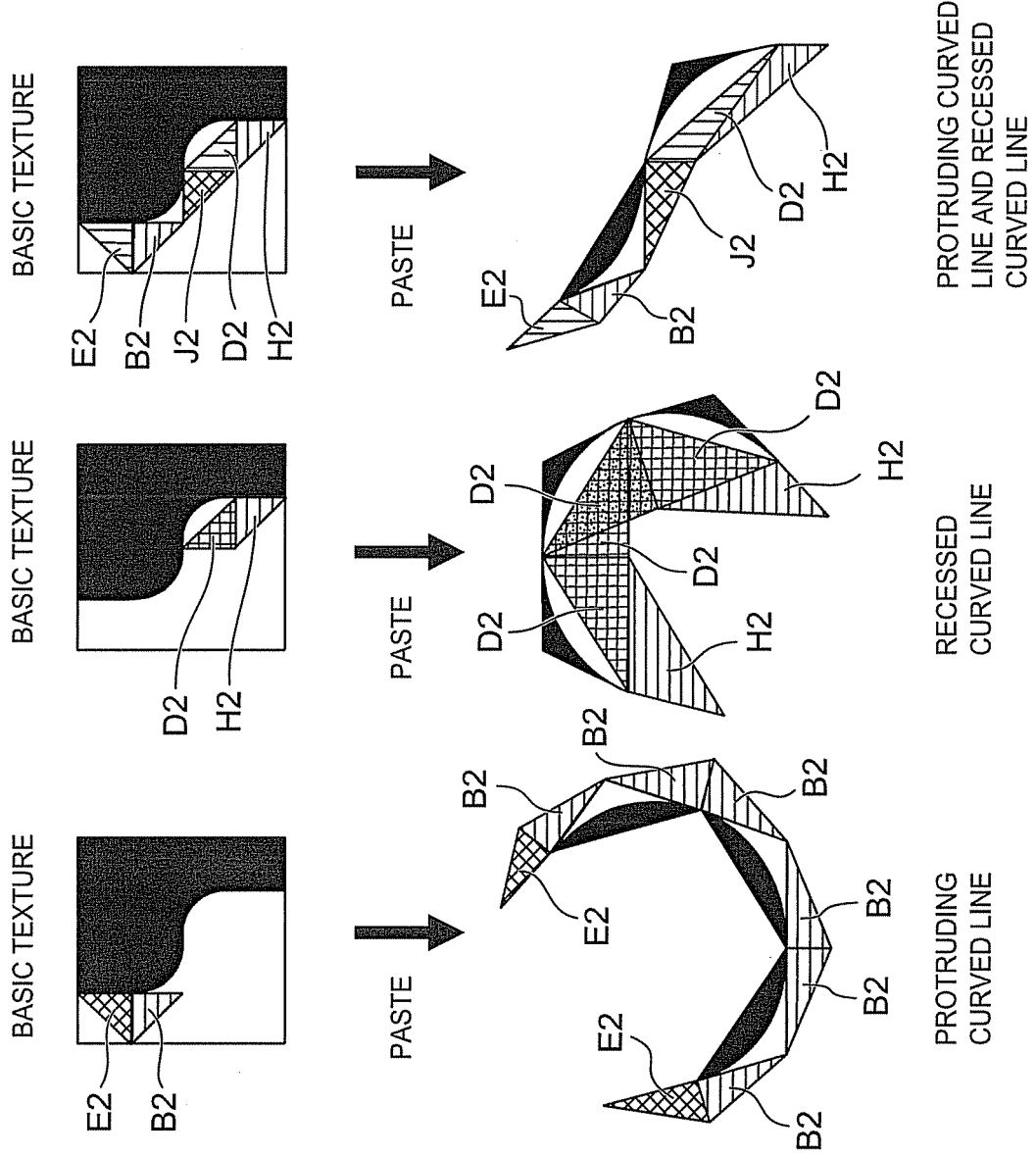

DRAWING APPARATUS, DRAWING METHOD, AND DRAWING PROGRAM

CROSS-REFERENCE TO RELATED APPLICATION

This application is based upon and claims the benefit of priority from Japanese Patent Application No. P2011-080233, filed on Mar. 31, 2011; the entire contents of which are incorporated herein by reference.

FIELD

Embodiments of the present invention herein generally relate to a drawing apparatus, a drawing method, and a drawing program.

BACKGROUND

There has been a drawing apparatus using a graphics processing unit (GPU) to draw character images based on outline data of characters. Such drawing apparatus performs anti-aliasing to make jaggy inconspicuous, thus drawing a character image with less image deterioration.

However, the conventional drawing apparatus requires complicated calculation processing such as differential calculus to perform the anti-aliasing process, and there is a problem in that the processing cost is high. Therefore, a drawing apparatus is desired that can draw a character image with less jaggy at a low processing cost.

BRIEF DESCRIPTION OF THE DRAWINGS

FIG. 6 is an explanatory diagram illustrating straight line segments;
FIG. 16 is an explanatory diagram illustrating processing performed by a fourth stencil generator 232;
FIG. 22 is an explanatory diagram illustrating processing performed by a third stencil generator 231;
FIG. 26 is an explanatory diagram illustrating processing performed by a third stencil generator 231;
and
FIG. 27 is an explanatory diagram illustrating processing performed by a fourth stencil generator 232;

DETAILED DESCRIPTION

Figure 1:
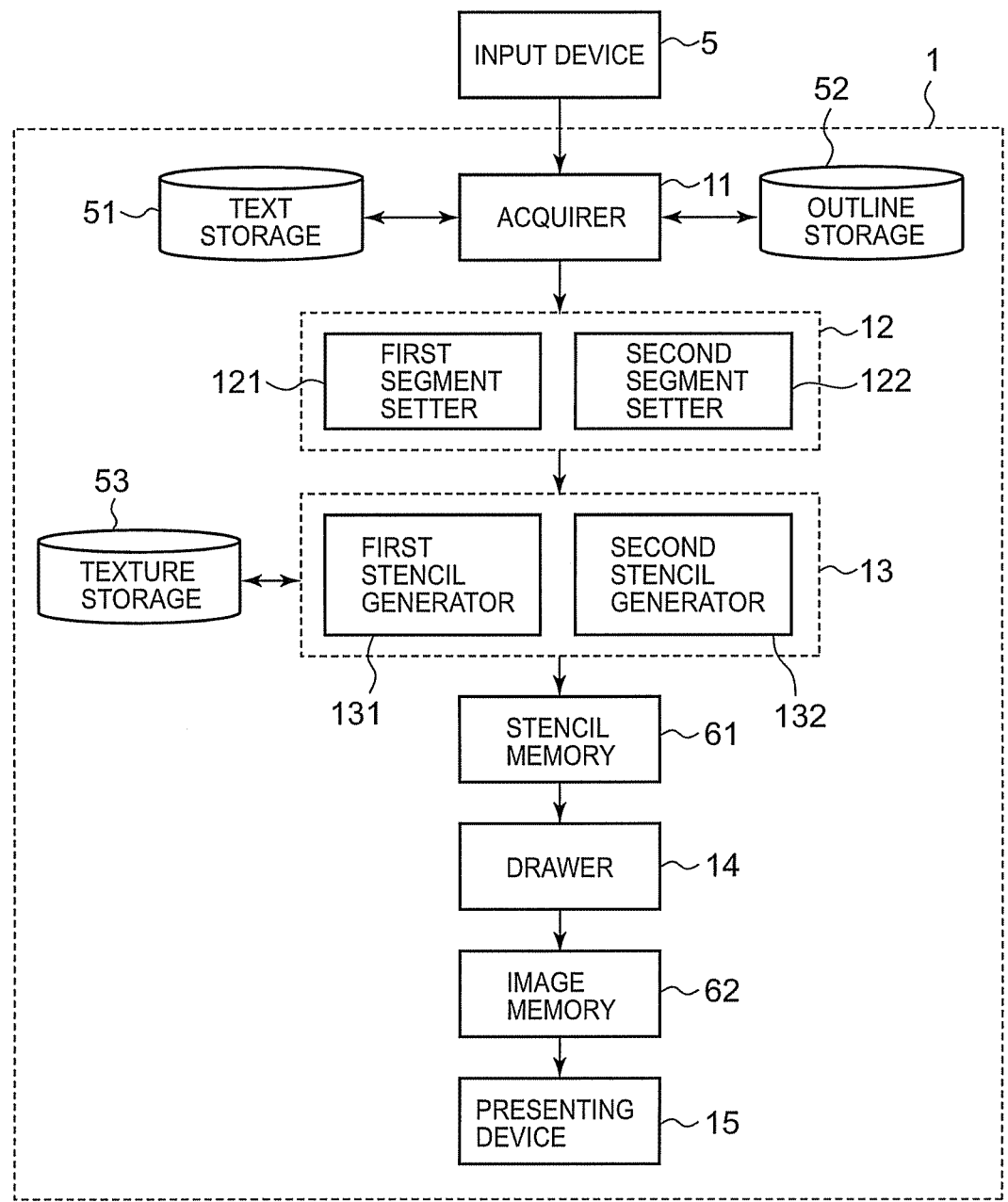
FIG. 1 is a block diagram illustrating a drawing apparatus 1 according to the first embodiment.

In view of the above circumstances, a drawing apparatus, a drawing method, and a drawing program that can draw a character image with less jaggy at a low processing cost is provided.

A drawing apparatus according to an aspect of one embodiment includes a segment setter, a first stencil generator, a second stencil generator, and a drawer.

The segment setter analyzes outline data and sets a straight line segment for drawing a straight line portion and a curved line segment for drawing a curved line portion, in the outline data. The first stencil generator generates stencil data of the straight line segment; The second stencil generator obtains a basic texture in which transparency is allocated for each of a plurality of regions in an image, maps a portion of the basic texture to the curved line segment in accordance with a shape of the curved line segment, and thereafter generates stencil data of the curved line segment.

The drawer draws a character image corresponding to the outline data, based on the stencil data of the straight line segment and the stencil data of the curved line segment.

First Embodiment

For example, a drawing apparatus 1 according to the first embodiment can be used in a television set or a recorder that displays Electronic Program Guide (EPG). The drawing apparatus 1 draws a corresponding character image based on vector format character data (outline data).

The drawing apparatus 1 analyzes obtained outline data, and draws a corresponding character image. The drawing apparatus 1 sets a region including at least one of a straight line segment and a curved line segment in the obtained outline data. The straight line segment is a region for drawing a straight line portion in the outline data. The curved line segment is a region for drawing a curved line portion in the outline data.

The drawing apparatus 1 pastes a texture defining alpha values a (transparency) in proximity to an edge at a curved line portion prepared (hereinafter referred to as a basic texture), in advance, to a curved line segment, and thereafter draws the curved line segment. As a result, the drawing apparatus 1 can draw a character image with less jaggy.

FIG. 1 is a block diagram illustrating the drawing apparatus 1. The drawing apparatus 1 includes an acquirer 11, a segment setter 12, a stencil generator 13, a drawer 14, a presenting device 15, a text storage 51, an outline storage 52, a texture storage 53, a stencil memory 61, and an image memory 62. The segment setter 12 includes a first segment setter 121 and a second segment setter 122. The stencil generator 13 includes a first stencil generator 131 and a second stencil generator 132.

An input device 5 is a remote controller, a mouse, a keyboard, a touch panel, and the like. For example, the input device 5 may give an instruction to the drawing apparatus 1 to display an EPG. The drawing apparatus 1 receives the instruction, and starts operation.

The text storage 51 stores a plurality of characters (text data). For example, the text storage 51 stores text data including a title, cast members, a start time, an end time, a program content, and the like of each program included in the EPG. It should be noted that the text storage 51 may obtain program information from broadcast waves received by a receiver (not shown), and update the text data with a regular interval.

Figure 2:
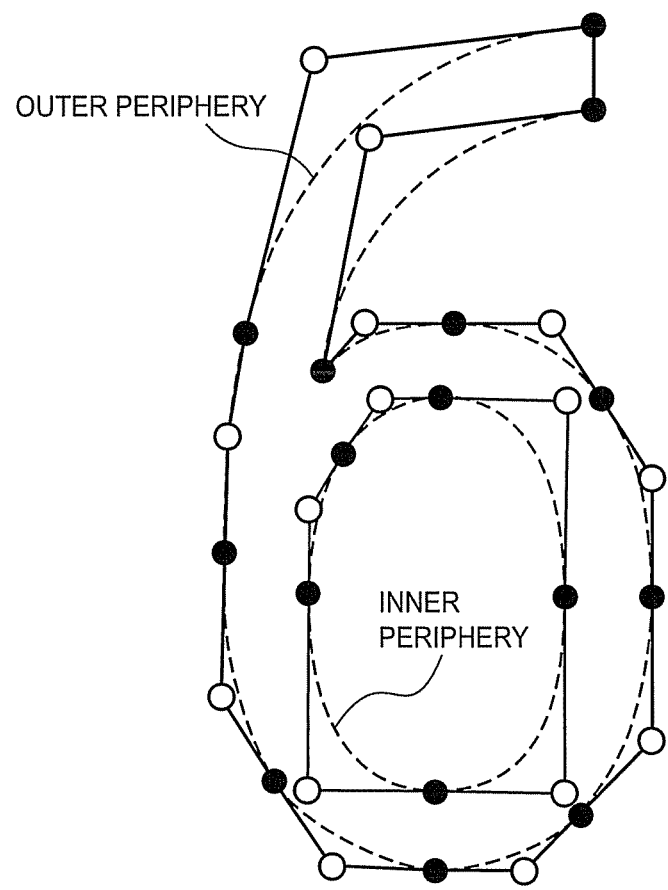
FIG. 2 is a figure illustrating an example of outline data.

The outline storage 52 stores outline data representing a shape of contour of each character. FIG. 2 is a figure illustrating an example of outline data of a character "6". The outline data are defined by a plurality of vertices and straight lines and curved lines (Bezier curves) connecting the vertices. In FIG. 2, a start point and an end point of a straight line and a start point and an end point of a curved line are represented by black circles (•), and a control point of a curved line is represented by a white circle (○). The control point indicates that a curved line in question protrudes to the side of the control point with respect to the straight line connecting the two points adjacent to the control point.

The outline storage 52 preferably stores at least outline data corresponding to the text data stored in the text storage 51.

The texture storage 53 stores basic textures used by the second stencil generator 132 explained later. FIG. 3 is a figure illustrating an example of a basic texture according to the present embodiment. As shown in FIG. 3, the basic texture according to the present embodiment is an image defining variation of an alpha value a in a region enclosed by a Bezier curve having a start point at a vertex A of a side of a rectangle (for example, a square), having an end point at a vertex B, and having a control point at a middle point C at a side opposite to the side.

In the basic texture of FIG. 3, a black region indicates non-transparency ($\alpha=1$), and a white region indicates complete transparency ($\alpha=0$). The alpha value a continuously changes in a border region (in proximity to the edge of the curved line), indicated by a vertical striped lines in FIG. 3, between a recessed region (recessed region in the triangle ABC) and a protruding region (protruding region in the triangle ABC).

Figure 3A:
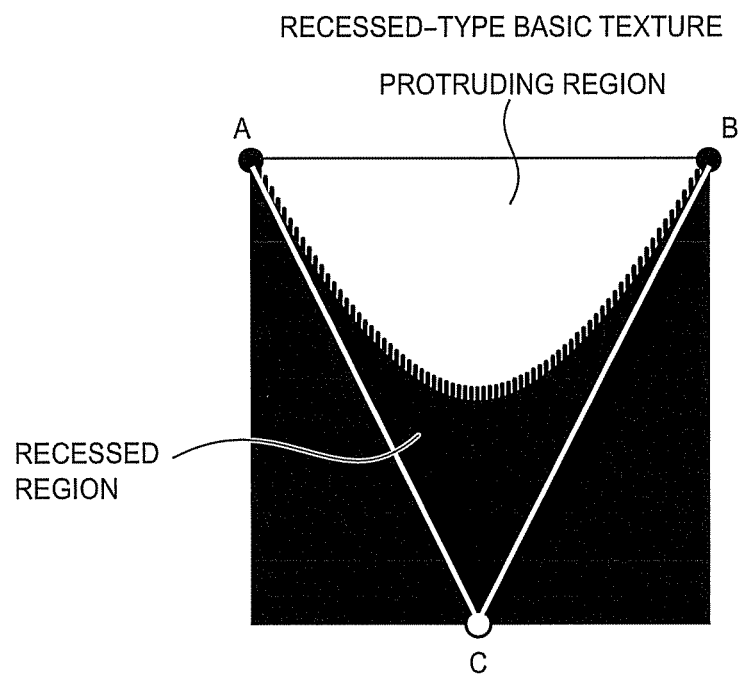
FIG. 3 is a figure illustrating an example of a basic texture according to the first embodiment.
Figure 3B:
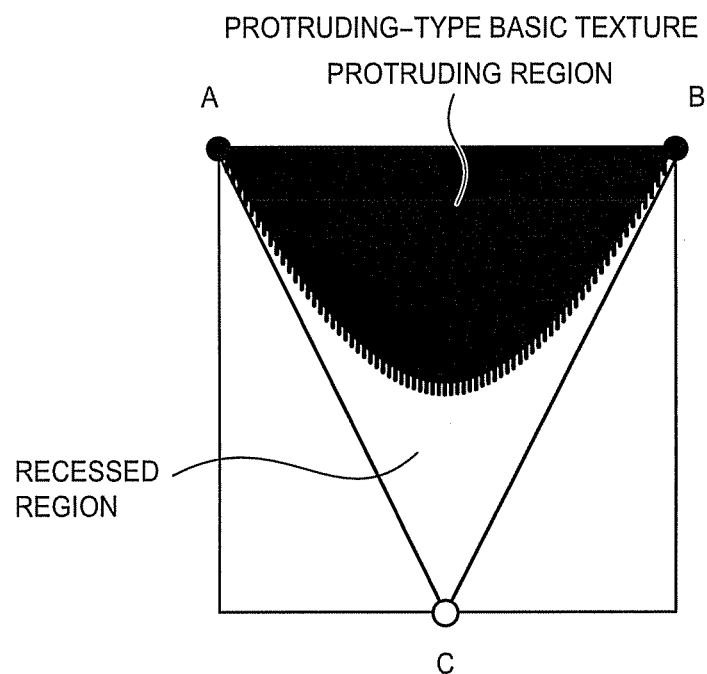

For example, in the border region in the recessed-type basic texture as shown in FIG. 3A, the alpha value a continuously changes from 0 to 1 as it moves from the protruding region (white) to the recessed region (black). On the other hand, in the border region in the protruding-type basic texture as shown in FIG. 3B, the alpha value a continuously changes from 1 to 0 as it moves from the protruding region (black) to the recessed region (white).

The acquirer 11 acquires one or a plurality of pieces of text data to be processed from the text storage 51, and acquires outline data corresponding to each character of the text data from the outline storage 52. The outline data of each character include a set of many points representing the edge of the character, and includes position data of a start point and an end point of a straight line or a curved line. When it is a curved line, the outline data further include the position data of a control point.

The first segment setter 121 analyzes the outline data, and sets straight line segments, the details of which will be explained later. The first segment setter 121 provides the straight line segments to the first stencil generator 131.

The second segment setter 122 analyzes the outline data, and sets curved line segments, the details of which will be explained later. The second segment setter 122 provides the curved line segments to the second stencil generator 132.

The first stencil generator 131 generates stencil data of the straight line segments. At this occasion, the first stencil generator 131 performs bitwise-inversion of the stencil value of each point (pixel) inside of the straight line segments, thus generating the stencil data of the straight line segments. The stencil value is a value representing whether a point in question is to be ultimately drawn or not (the stencil value may be a flag of either zero or nonzero). The first stencil generator 131 writes the generated stencil data to the stencil memory 61.

The second stencil generator 132 generates stencil data of curved line segments. At this occasion, the second stencil generator 132 cuts out a triangular region (a region enclosed by a gray line in FIG. 3) enclosed by the start point A, the control point C, and the end point B from the basic texture stored in the texture storage 53, and maps the triangular region according to the shape of the curved line segment.

Then, the second stencil generator 132 performs bitwise-inversion of the stencil values of points (pixels) located inside of the curved line segments at which the alpha values a are nonzero, thus generating stencil data of the curved line segments. The second stencil generator 132 writes the generated stencil data to the stencil memory 61.

The stencil values written to the stencil memory 61 are initialized to zero for each frame.

The drawer 14 generates a rectangle polygon (bounding box) covering the entire outline data. Then, for each pixel located inside of the rectangle polygon, the stencil value of the pixel at the corresponding position stored in the stencil memory 61 is looked up, and unless the stencil value is zero, an RGB value is written to the image memory 62. Thus, the character image is written to the image memory 62.

More specifically, at each point in the image memory 62, the pixel value (color value) in RGBA format is held. R denotes a red component, G denotes a green component, B denotes a blue component, and A denotes an alpha value. The value of R, G, B of each pixel is initialized to zero for each frame. The value of A in each pixel is initialized to one for each frame.

The presenting device 15 reads a character image from the image memory 62 and presents the character image. The presenting device 15 may be a display, a printer, and the like.

The acquirer 11 and the segment setter 12 may be realized with a central processing unit (CPU) and memory used by the CPU. The stencil generator 13 may be realized with a graphics processing unit (GPU) and memory used by the GPU. The text storage 51, the outline storage 52, the texture storage 53, the stencil memory 61, and the image memory 62 may be realized with a CPU and memory used by the CPU (such as RAM and VRAM) or an auxiliary storage device.

The configuration of the drawing apparatus has been hereinabove explained.

Figure 4:
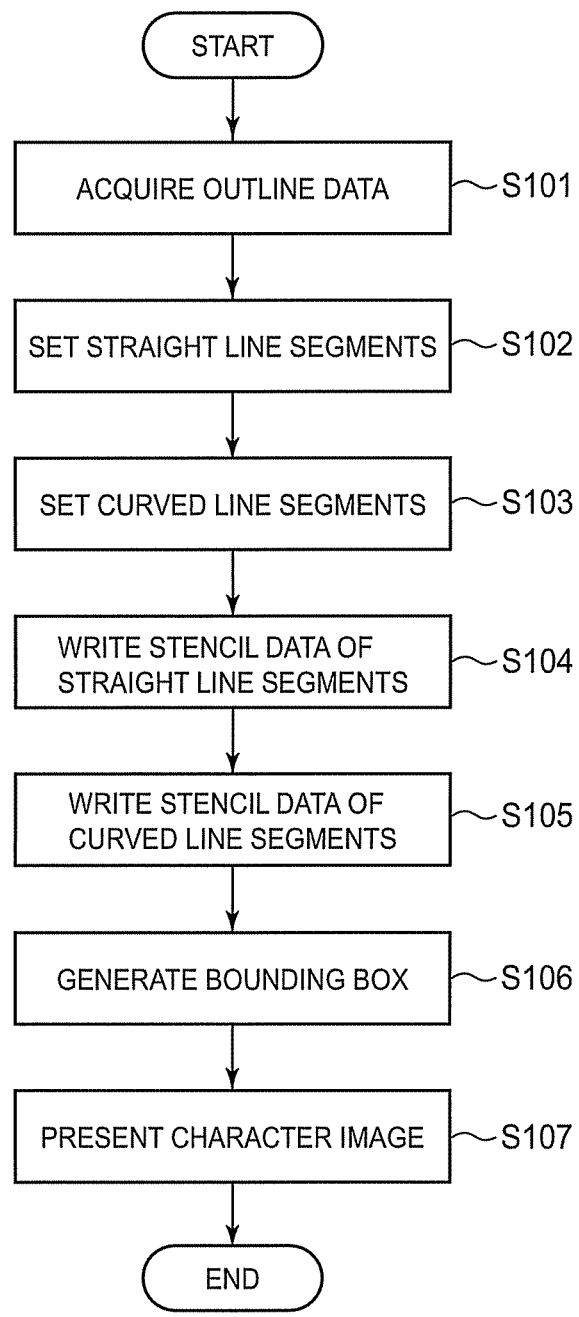
FIG. 4 is a flowchart illustrating processing performed by the drawing apparatus 1.

FIG. 4 is a flowchart illustrating processing performed by the drawing apparatus 1.

In step S101, the acquirer 11 acquires one or a plurality of pieces of text data to be processed from the text storage 51, and acquires outline data corresponding to the text data from the outline storage 52 (S101). The acquirer 11 supplies the acquired outline data to the first segment setter 121 and the second segment setter 122.

In step S102, the first segment setter 121 analyzes the supplied outline data, and sets straight line segments (S102). The first segment setter 121 generates a polygon by connecting a start point and an end point of a straight line, a start point, a control point, and an end point of a recessed curved line, and a start point and an end point of a protruding curved line in the contour line of the outline data. At this occasion, the first segment setter 121 connects the three points, i.e., the start point, the control point, and the end point, for the recessed curved line, and connects the two points, i.e., the start point and the end point, for the protruding curved line.

In this case, the recessed curved line means a curved line recessed from the inside to the outside of the contour of the outline, and the protruding curved line means a curved line protruding from the inside to the outside of the contour of the outline.

Figure 5A:
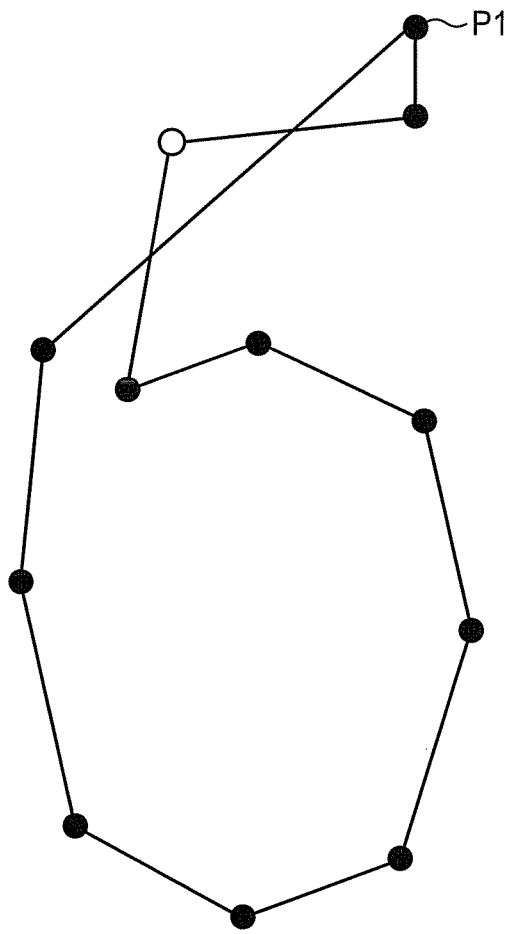
FIG. 5 is a figure illustrating an example of a polygon generated by a first segment setter 121.
Figure 5B:
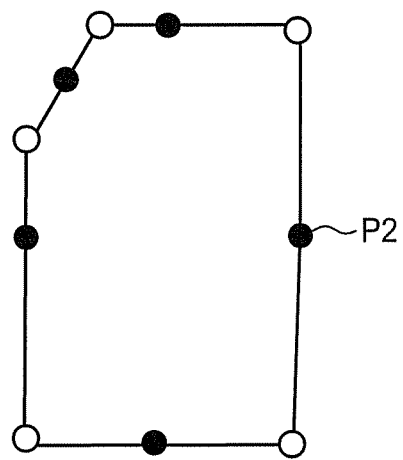

The outline data of the character "6" as shown in FIG. 2 include the contour line of the outer periphery and the contour line of the inner periphery. In this case, as shown in FIG. 5, the first segment setter 121 respectively generates a polygon of the outer periphery (FIG. 5A) and a polygon of the inner periphery (FIG. 5B).

The first segment setter 121 selects any given point (hereinafter referred to as pivot) from among vertices in the generated polygon. Then, first segment setter 121 connects the pivot and vertices at both ends of each side, thereby generating a plurality of triangles (triangle group). In the case as shown in FIG. 5, for example, the first segment setter 121 may select a vertex P1 as a pivot of the polygon of the outer periphery, and may select a vertex P2 as a pivot of the polygon of the inner periphery.

FIG. 6 is an explanatory diagram illustrating straight line segments. The triangle groups as shown in FIG. 6A are generated from the polygon of the outer periphery as shown in FIG. 5A. The triangle groups as shown in FIG. 6B are generated from the polygon of the inner periphery as shown in FIG. 5B. The straight line segments are made by combining the triangle groups as shown in FIG. 6A and the triangle groups as shown in FIG. 6B. The first segment setter 121 supplies the straight line segments to the first stencil generator 131. The method in step S102 may be the same as the method described in Japanese Patent Application Laid-Open No. 2007-241878.

Figure 7A:
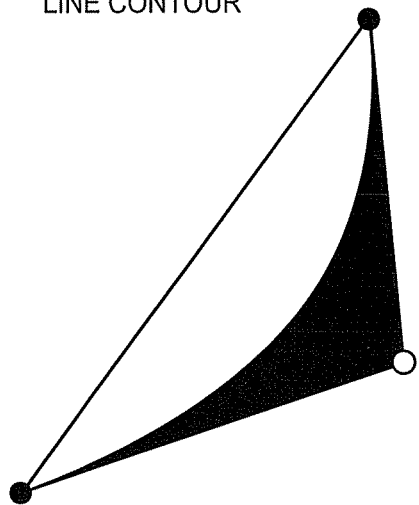
FIG. 7 is an explanatory diagram illustrating curved line segments.
Figure 7B:
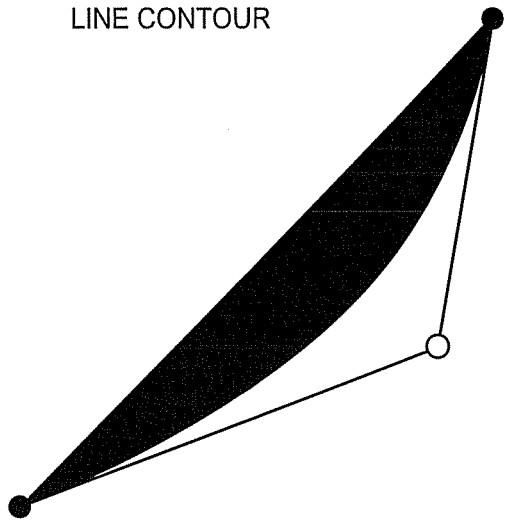

In step S103, the second segment setter 122 analyzes the outline data, and sets curved line segments (S103). FIG. 7 is an explanatory diagram illustrating curved line segments. The curved line segment includes a recessed curved line contour (FIG. 7A) and a protruding curved line contour (FIG. 7B). The recessed curved line contour is a curved line whose recessed region is located inside of a figure, and the protruding curved line contour is a curved line whose protruding region is located inside of a figure.

Figure 7C:
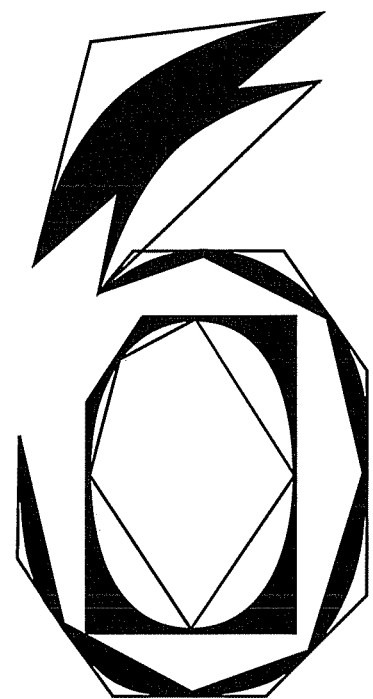

The second segment setter 122 generates a recessed curved line contour by connecting a start point and an end point of a recessed curved line, and generates a protruding curved line contour by connecting a start point, a control point, and an end point of a protruding curved line. The curved line segments are made by combining the recessed curved line contours and the protruding curved line contours (FIG. 7C). The second segment setter 122 supplies the curved line segments to the second stencil generator 132. The method in step S103 may be the same as the method described in Japanese Patent Application Laid-Open No. 2007-241878.

In step S104, the first stencil generator 131 performs bitwise-inversion of the stencil value of each point (pixel) located inside of the straight line segments to generate the stencil data of the straight line segments, and writes the stencil data to the stencil memory 61 (S104). The method in step S104 may be the same as the method described in Japanese Patent Application Laid-Open No. 2007-241878.

In step S105, the second stencil generator 132 generates stencil data of the curved line segments, and writes the stencil data to the stencil memory 61 (S105).

The second stencil generator 132 maps the basic texture as shown in FIG. 2 to the curved line segments, and writes only the points (pixels) at which the alpha values are nonzero to the stencil memory 61. At this occasion, the stencil values of these pixels are subjected to bitwise-inversion. More specifically, in a triangle representing a recessed curved line, the bits of the stencil values of the pixels in the recessed region are flipped, and in a triangle representing a protruding curved line, the bits of the stencil values of the pixels in the protruding region are flipped.

Figure 8:
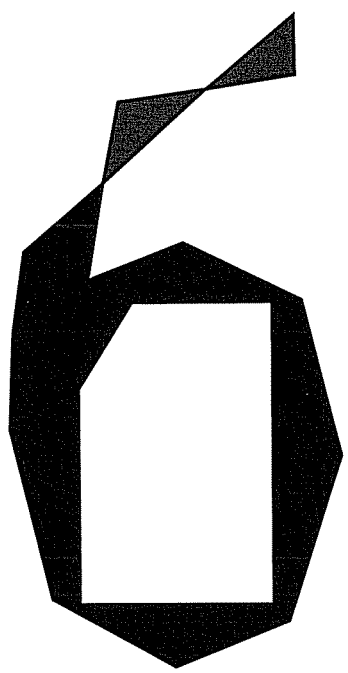
FIG. 8 is a figure illustrating an example of stencil data.
Figure 9:
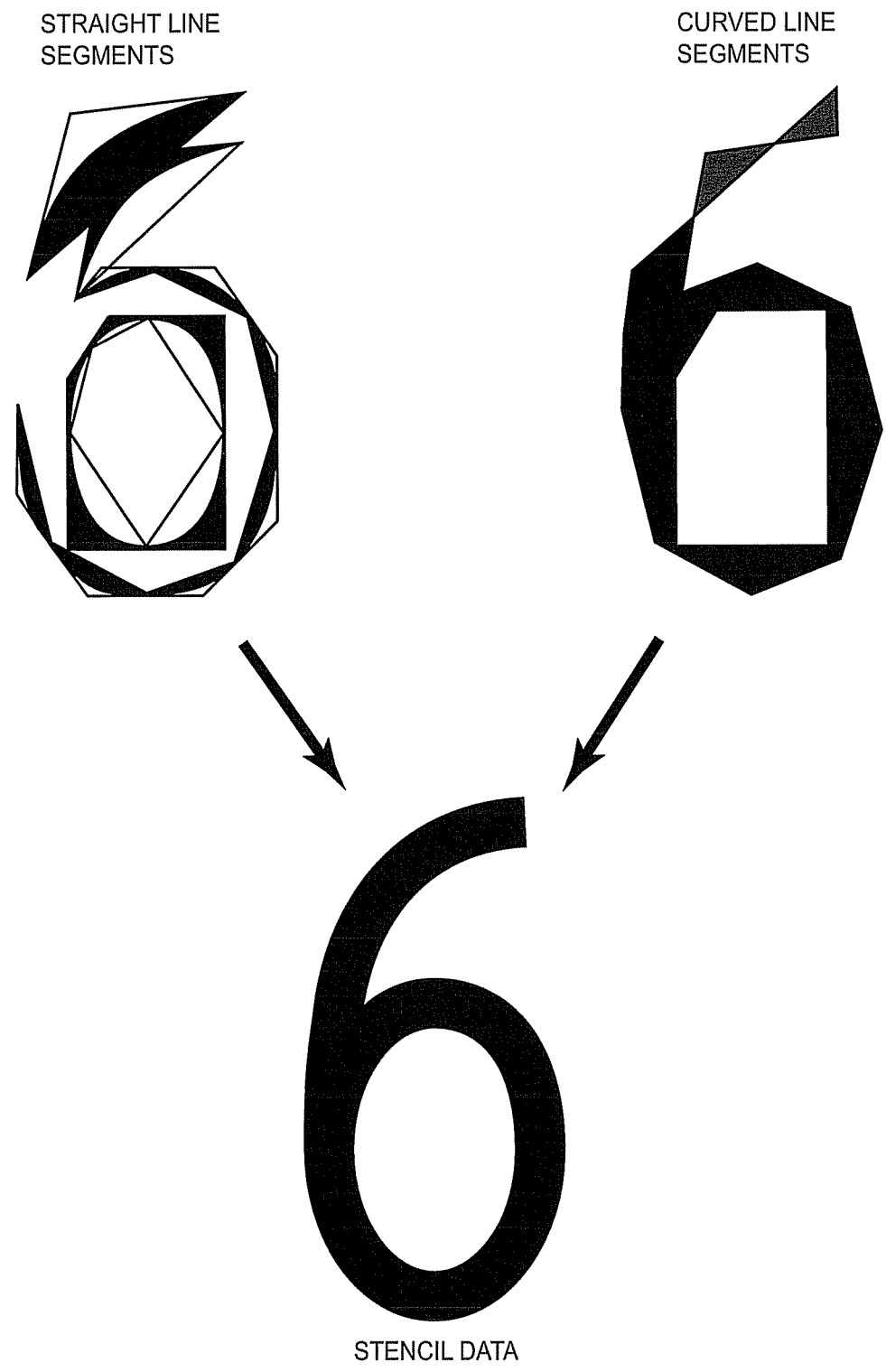
FIG. 9 is a figure illustrating an example of stencil data.

For example, when the first stencil generator 131 has already drawn the line segments and the stencil memory 61 stores the stencil data as shown in FIG. 8, the second stencil generator 132 draws curved line segments as shown in FIG. 7C. In this case, the stencil data are updated as shown in the lower part of FIG. 9. In FIGS. 8 and 9, the points at which the stencil values are zero are shown in white, and the points at which the stencil values are nonzero are shown in black.

The second stencil generator 132 compares the alpha value a set in the basic texture and the alpha value a stored in the image memory 62 at each point of each triangular region of the curved line segments. Then, when the alpha value a set in the basic texture is determined to be less than the alpha value a stored in the image memory 62, the alpha value a at that point is written to the image memory 62.

In step S106, the drawer 14 reads the stencil value at each point (each pixel) in the stencil data from the stencil memory 61, and generates a rectangle polygon (bounding box) covering the entire outline data (S106). Then, for each pixel located inside of the rectangle polygon, the stencil value of the pixel at the corresponding position stored in the stencil memory 61 is looked up, and unless the stencil value is zero, an RGB value is written to the image memory 62.

In step S107, the presenting device 15 presents the character image read from the image memory 62 (S107). At this point, the processing of the drawing apparatus 1 is finished.

The processing performed by the drawing apparatus 1 has been hereinabove explained.

In the techniques disclosed in Japanese Patent Application Laid-Open No. 2006-106705, Japanese Patent Application Laid-Open No. 2007-241878, and Japanese Patent Application Laid-Open No. 2007-304871, an implicit function of the Bezier curve is calculated at each pixel inside of the triangle, and on the basis of the sign (positive/negative) of the value, a determination is made as to whether each pixel belongs to the recessed region or the protruding region.

Using the expression 1, a signed distance from each pixel inside of the triangle to an edge of a curved line is calculated. An alpha value is allocated to each pixel so that each pixel linearly changes according to the magnitude of the distance, and accordingly, the color of the character (foreground color) and the background color are mixed. Thus, anti-aliasing of the curved line is achieved.

In the present embodiment, the triangular region indicated by the line in gray is cut out from the basic texture as shown in FIG. 2, and is mapped according to the shape of each triangle constituting the curved line segments. Therefore, a character image can be drawn with less jaggy at a low processing cost.

Second Embodiment

Figure 10A:
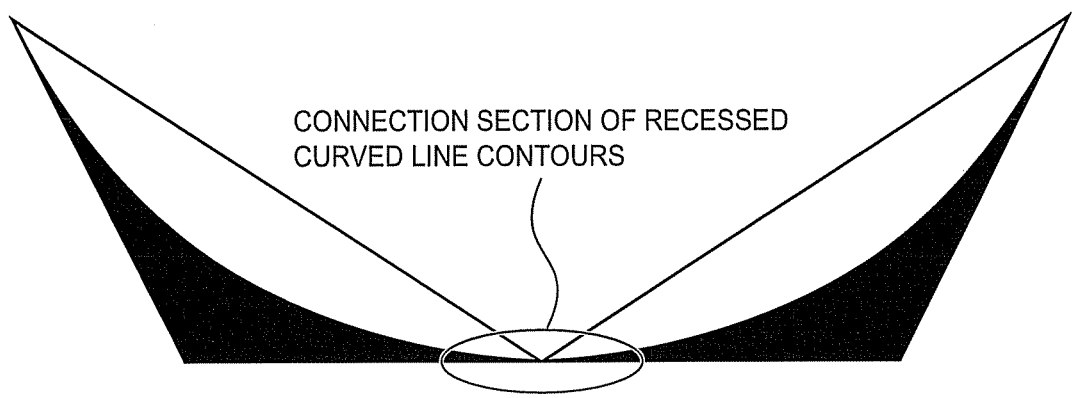
FIG. 10 is a figure illustrating an example of a drawing result of a connection portion between a curved line and a curved line.
Figure 10B:
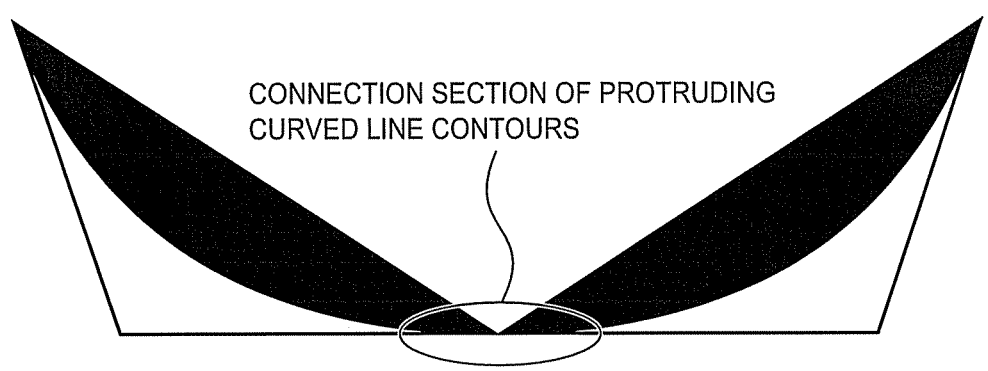

FIG. 10 is a figure illustrating an example of a drawing result of a connection portion between a curved line and a curved line according to the above embodiment. As shown in FIG. 10, in the drawing result given by the drawing apparatus 1 according to the first embodiment, a connection section between the curved line and the curved line (portion enclosed by a circle in FIG. 10) may not be smoothly connected and may be discontinuous. For example, a dot may be lost in the curved line of the character image thus drawn.

This is because when the plurality of curved line segments explained above are connected, there are not enough pixels for representing semi-transparent colors in proximity to the connection section.

In the second embodiment, points (pixels) for representing semi-transparent colors in proximity to the connection section are complemented by newly generating a triangle inscribed and a triangle circumscribed at the connection portion between the curved line and the curved line. Accordingly, a texture representing change of the alpha value a at the connection portion is adopted as a basic texture.

Figure 11:
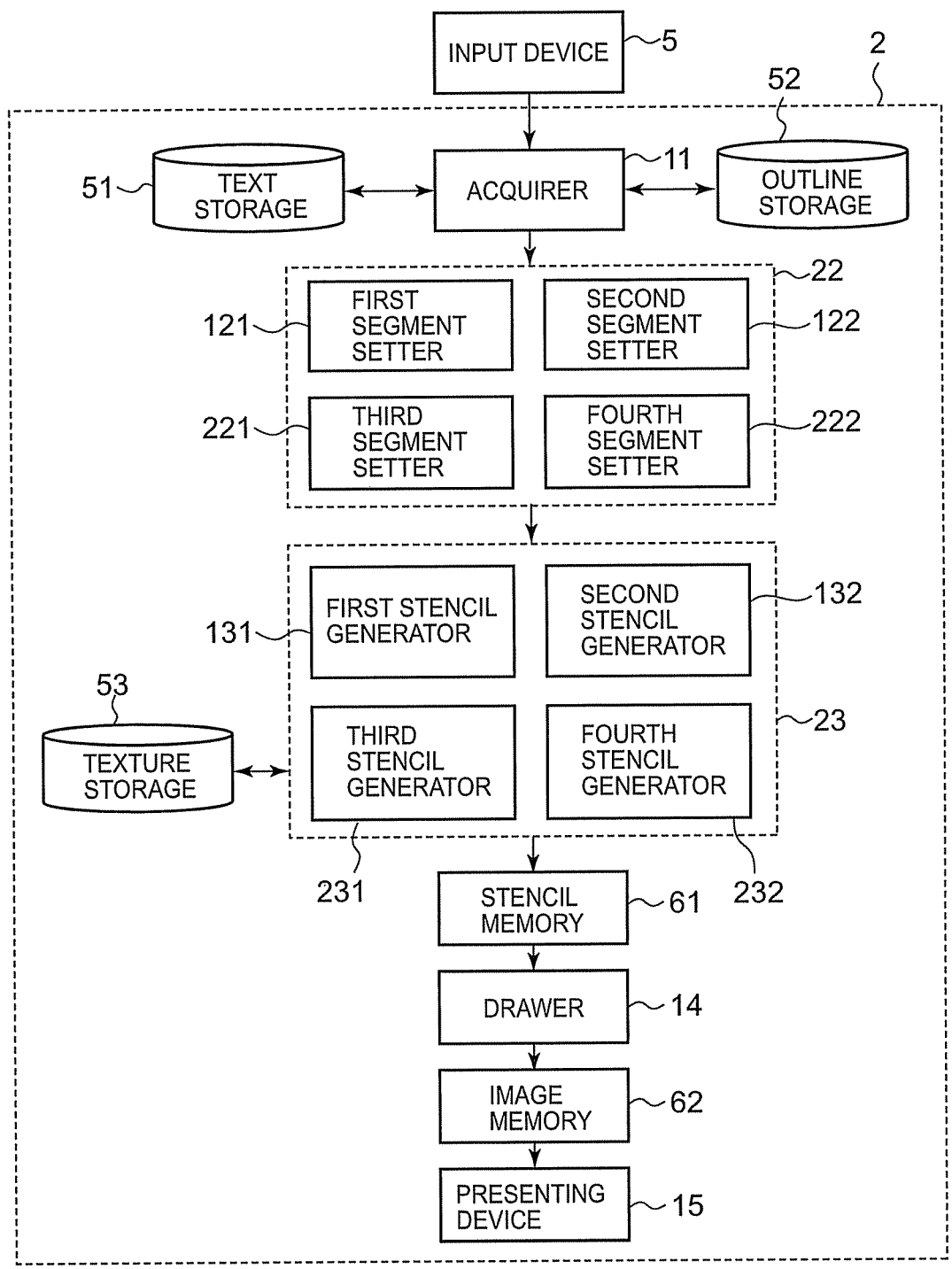
FIG. 11 is a block diagram illustrating a drawing apparatus 2 according to the second embodiment.

FIG. 11 is a block diagram illustrating a drawing apparatus 2 according to the present embodiment. The drawing apparatus 2 is different from the drawing apparatus 1 in processing of a segment setter 22 and processing of a stencil generator 23. As compared with the segment setter 12, the segment setter 22 further includes a third segment setter 221 and a fourth segment setter 222. As compared with the stencil generator 13, the stencil generator 23 includes a third stencil generator 231 and a fourth stencil generator 232.

Figure 12A:
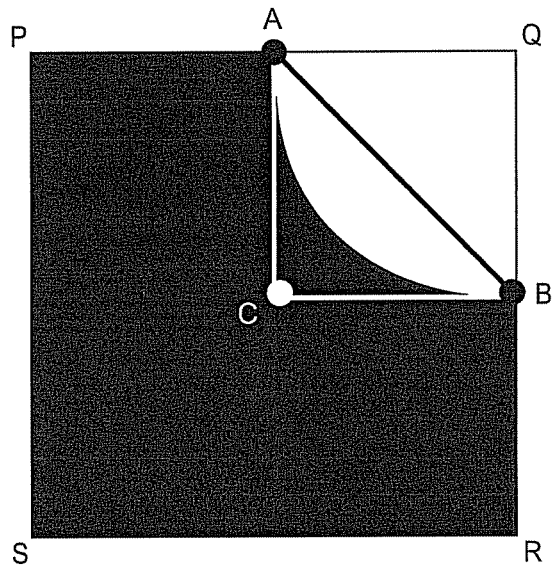
FIG. 12 is a figure illustrating an example of a basic texture according to the second embodiment.
Figure 12B:
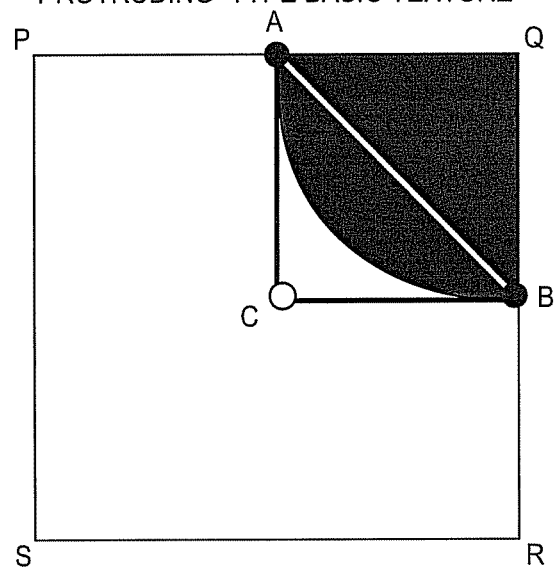

A basic texture stored in a texture storage 53 is different from that of the drawing apparatus 1. FIG. 12 is a figure illustrating an example of a basic texture according to the present embodiment. As shown in FIG. 12, the basic texture according to the present embodiment is an image defining variation of an alpha value a in a region enclosed by a Bezier curve AB having a start point at a middle point A of a side PQ of a rectangle (for example, square) PQRS, having an end point at a middle point B of another side QR crossing the side PQ, and having a control point at a central point C of the rectangle PQRS. The texture storage 53 stores the basic texture of FIG. 12.

In the basic texture according to the present embodiment, the alpha value a continuously changes in a border from non-transparent region ($\alpha=1$) to completely transparent region ($\alpha=0$).

Figure 13A:
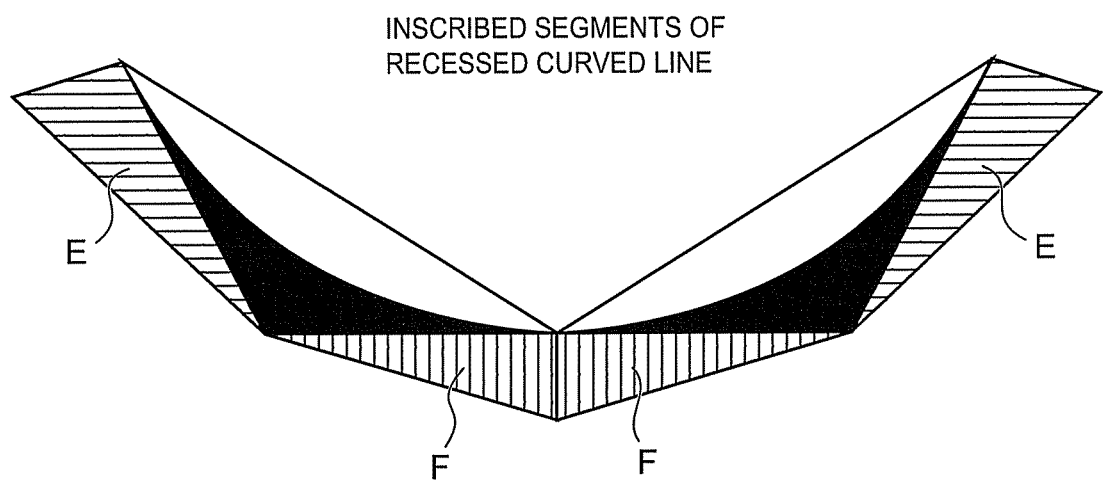
FIG. 13 is a figure illustrating an example of inscribed segments.
Figure 13B:
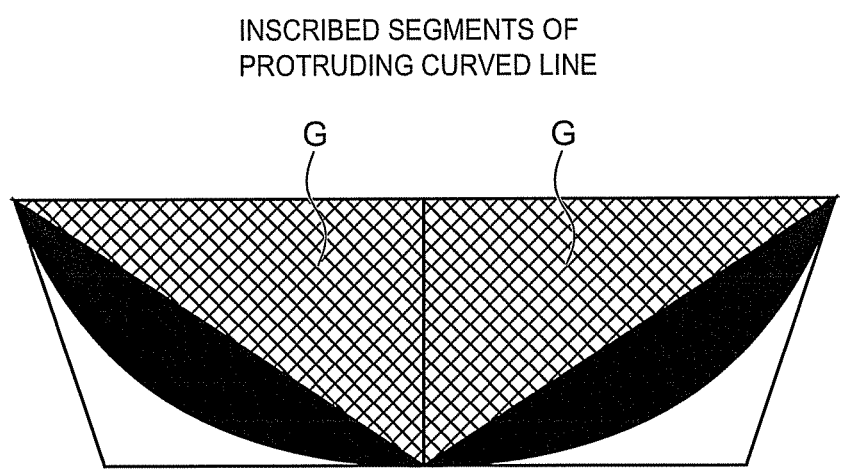

The third segment setter 221 analyzes the outline data, and sets inscribed segments. FIG. 13 is a figure illustrating an example of inscribed segments. FIG. 13A shows inscribed segments of a recessed curved line. FIG. 13B shows inscribed segments of a protruding curved line. The third segment setter 221 generates a triangle group (triangles E, F, G in FIG. 13) inscribed at a connection portion between a curved line and a curved line in the outline data.

Figure 14A:
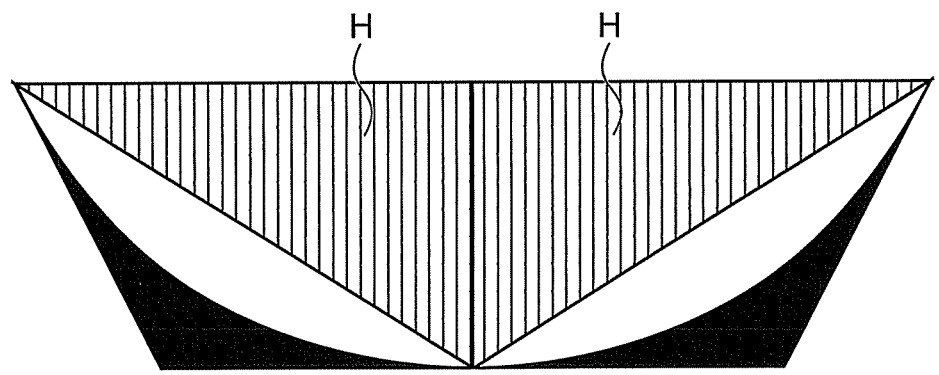
FIG. 14 is a figure illustrating an example of circumscribed segments.
Figure 14B:
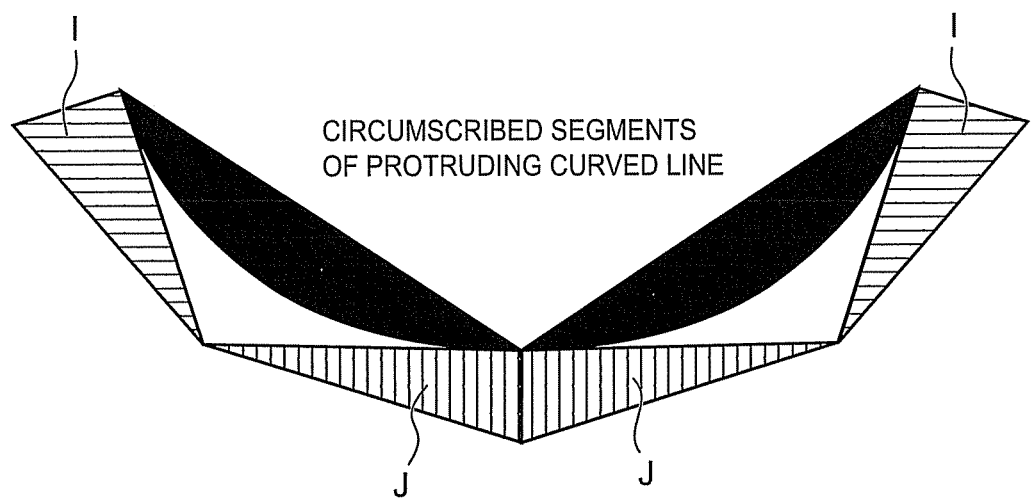

The fourth segment setter 222 analyzes the outline data, and sets circumscribed segments. FIG. 14 is a figure illustrating an example of circumscribed segments. FIG. 14A shows circumscribed segments of a recessed curved line. FIG. 14B shows circumscribed segments of a protruding curved line.

The fourth segment setter 222 generates a triangle group (triangles H, I, J in FIG. 14) circumscribed at a connection portion between a curved line and a curved line in the outline data.

Figures 15A, 15B:
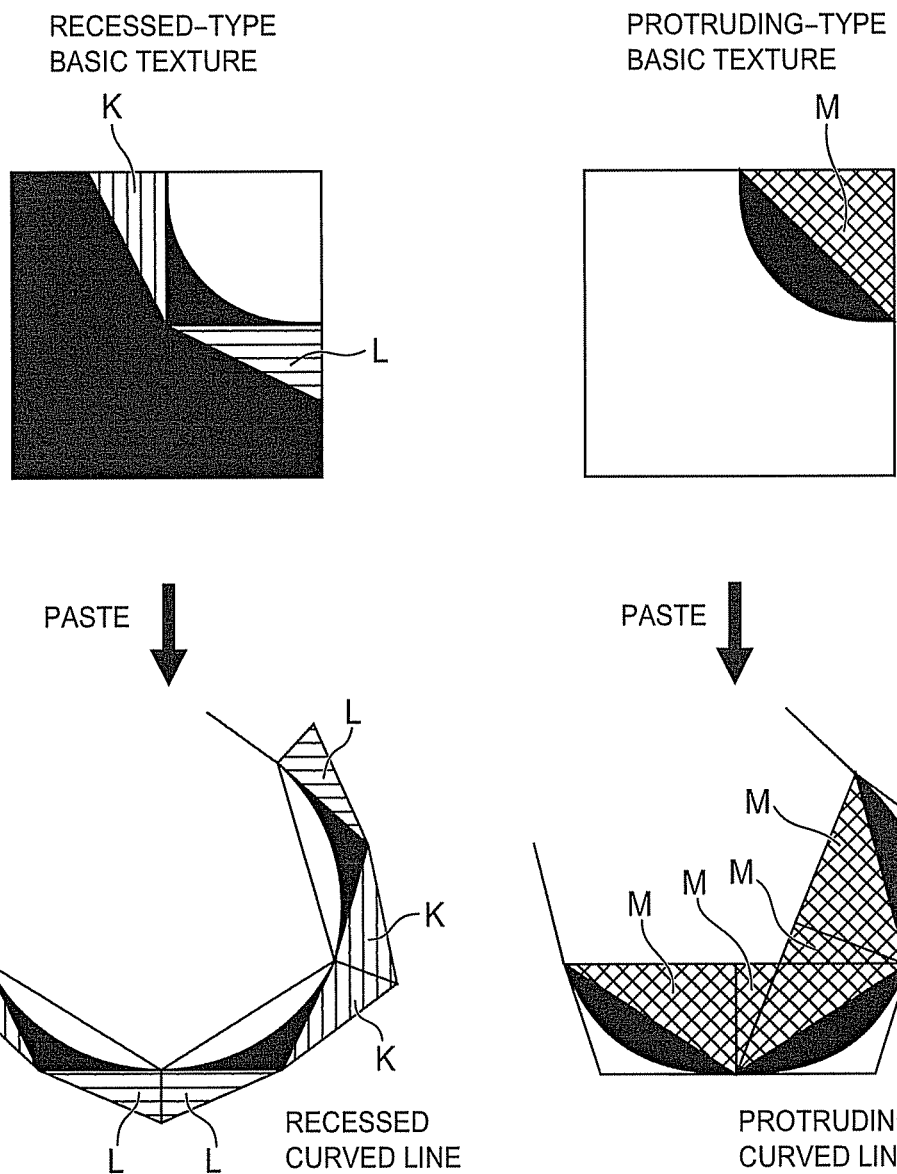
FIG. 15 is an explanatory diagram illustrating processing performed by a third stencil generator 231.

The third stencil generator 231 generates stencil data corresponding to the generated inscribed segments. FIG. 15 is an explanatory diagram illustrating processing performed by the third stencil generator 231. FIG. 15A shows stencil data corresponding to the recessed curved line. FIG. 15B shows stencil data corresponding to the protruding curved line. The third stencil generator 231 cuts out triangular regions from the basic texture as shown in FIG. 12, and maps the triangular regions to the generated inscribed segments.

In other words, the third stencil generator 231 generates the stencil data corresponding to the inscribed segments by cutting out the triangular regions (triangles K, L, M) from the basic texture as shown in FIG. 12 and pasting the triangular regions to the generated inscribed segments (K, L, M).

After the third stencil generator 231 maps the region cut out from the basic texture, and thereafter writes points (pixels) at which the alpha values a are nonzero to the stencil memory 61. At this occasion, the stencil values of these points (pixels) are subjected to bitwise-inversion.

The third stencil generator 231 compares the alpha value a set in the basic texture and the alpha value a stored in the image memory 62 at each pixel of each triangle of the inscribed segments. Then, when the alpha value a set in the basic texture is determined to be less than the alpha value a stored in the image memory 62, the alpha value a at that point is written to the image memory 62.

The fourth stencil generator 232 generates stencil data corresponding to the generated circumscribed segments. FIG. 16 is an explanatory diagram illustrating processing performed by the fourth stencil generator 232. FIG. 16A shows stencil data corresponding to the recessed curved line. FIG. 16B shows stencil data corresponding to the protruding curved line.

The fourth stencil generator 232 cuts out triangular regions from the basic texture as shown in FIG. 12, and maps the triangular regions to the generated circumscribed segments.

In other words, the fourth stencil generator 232 generates the stencil data corresponding to the circumscribed segments by cutting out the triangular regions (triangles S, T, U) from the basic texture as shown in FIG. 12 and pasting the triangular regions to the generated circumscribed segments (S, T, U).

The fourth stencil generator 232 uses the alpha value a set in the basic texture to mix the RGB values of the color of the character (foreground color) and the background color, thus complementing the semi-transparent colors in proximity to the connection section.

The configuration of the drawing apparatus 2 has been hereinabove explained.

Figure 17:
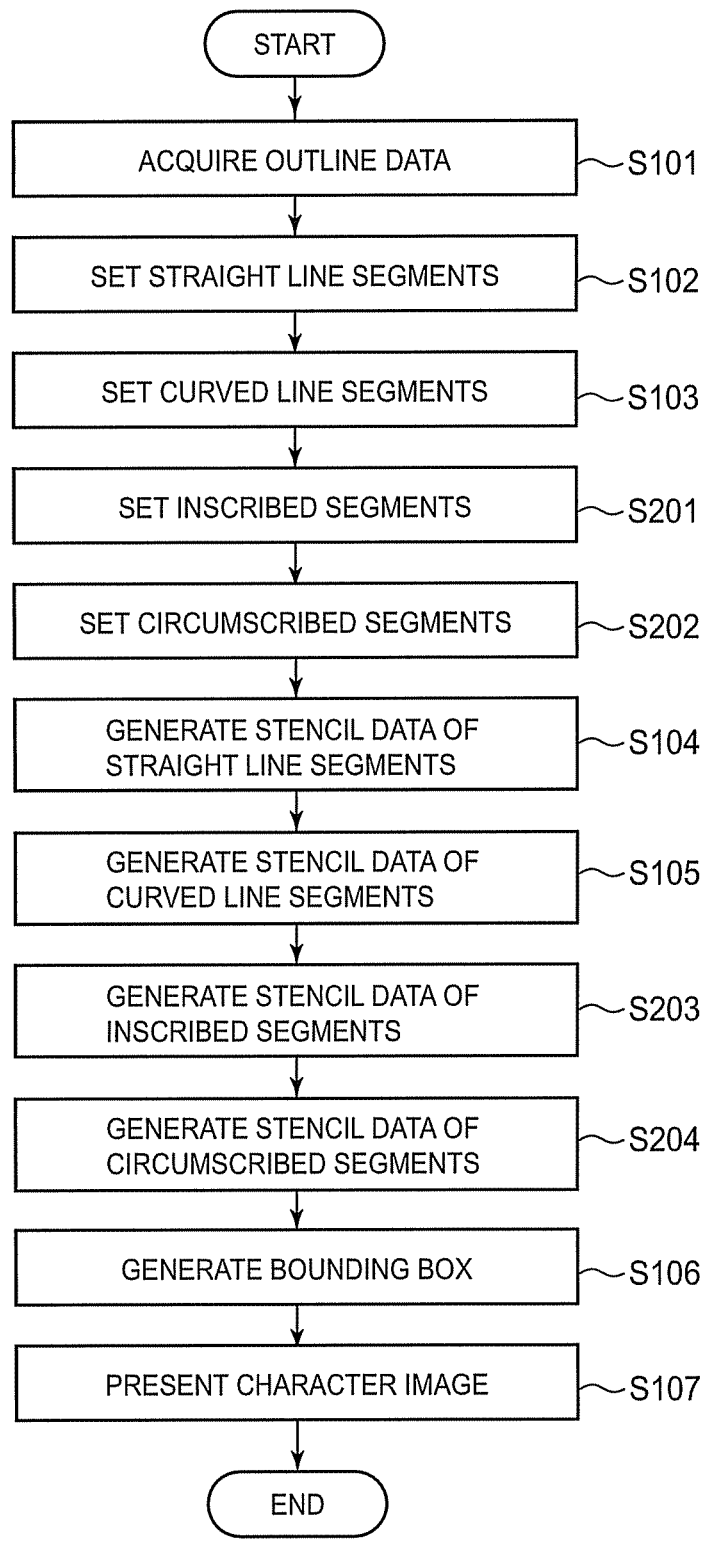
FIG. 17 is a flowchart illustrating processing performed by a drawing apparatus 2.

FIG. 17 is a flowchart illustrating processing performed by the drawing apparatus 2. The processing of the drawing apparatus 2 further includes step S201, step S202, step S203, and step S204 in addition to the processing performed by the drawing apparatus 1 as shown in FIG. 4.

In step S201, the third segment setter 221 analyzes the outline data, and generates inscribed segments (S201).

In step S202, the fourth segment setter 222 analyzes the outline data, and generates circumscribed segment (S202).

In step S203, the third stencil generator 231 generates stencil data corresponding to the generated inscribed segments (S203).

In step S204, the fourth stencil generator 232 generates stencil data corresponding to the generated circumscribed segments (S204).

In the present embodiment, triangle groups inscribed and circumscribed at the connection portion between the curved line and the curved line are newly drawn, and the alpha values a in proximity to the connection section stored in the basic texture are mapped to the triangle groups. Thus, the connection section between the curved line and the curved line is continuously, smoothly connected.

(First Modification)

Figure 18A:
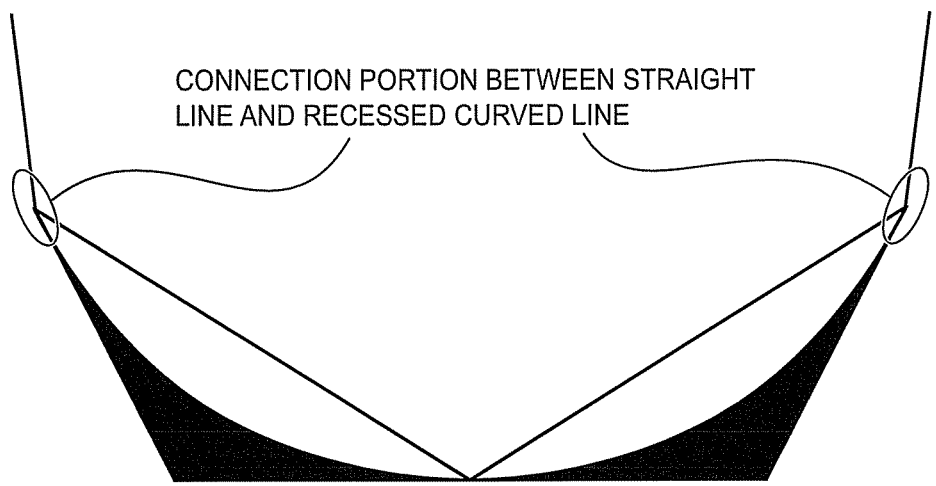
FIG. 18 is a figure illustrating an example of a drawing result of a connection portion between a curved line and a straight line.
Figure 18B:
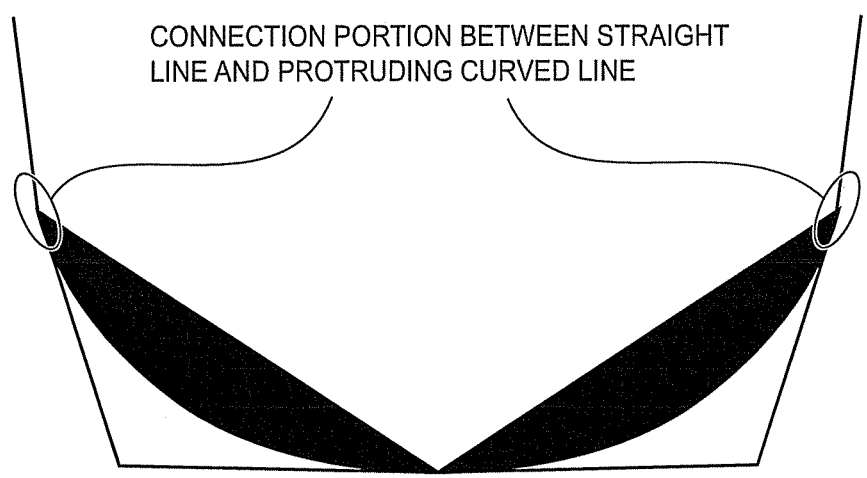

FIG. 18 is a figure illustrating an example of a drawing result of a connection portion between a curved line and a straight line according to the above embodiment. As shown in FIG. 18, in the drawing result according to the above embodiment, a connection section between the curved line and the straight line (portion enclosed by a circle in FIG. 18) may not be smoothly connected and may be discontinuous. For example, a dot may be lost in the connection portion between the curved line and the straight line in the character image.

In the first modification, points (pixels) for representing semi-transparent colors in proximity to the connection section are complemented by newly generating a triangle inscribed and a triangle circumscribed at the connection portion between the curved line and the straight line. Accordingly, a texture representing change of the alpha value a at the connection portion is adopted as a basic texture.

Figure 19A:
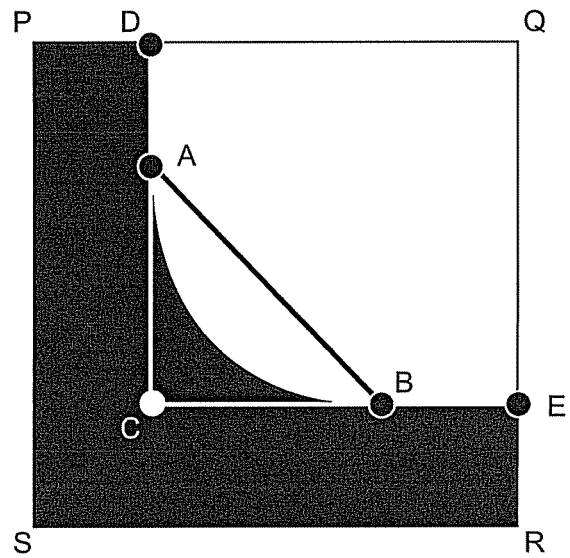
FIG. 19 is a figure illustrating an example of a basic texture according to the first modification of the second embodiment.
Figure 19B:
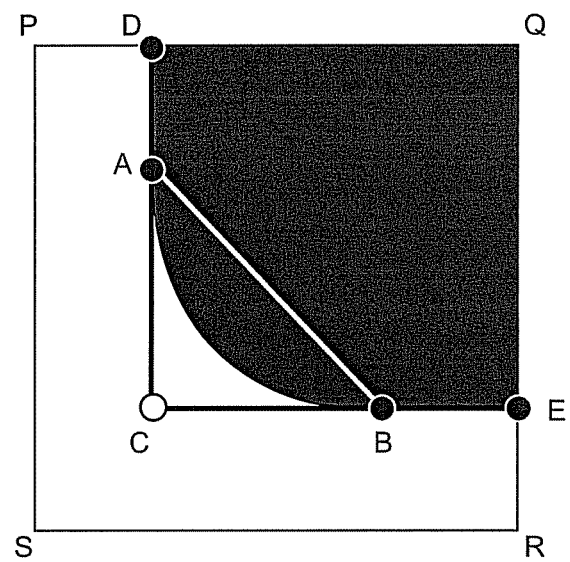

FIG. 19 is a figure illustrating an example of a basic texture according to the first modification. As shown in FIG. 19, the basic texture according to the first modification is an image defining variation of an alpha value a in a figure made by connecting, in a rectangle (for example, square) PQRS, (1) a straight line DA connecting between a point D on a side PQ and a point A on a line passing through the point D and being perpendicular to the side PQ, (2) a straight line EB connecting between a point E on a side QR crossing the side PQ and a point B on a line passing through the point E and being perpendicular to the side QR, and (3) a Bezier curve AB having a start point at the point A, having an end point at the point B, and having a control point at a crossing point C between the straight line DA and the straight line EB. A texture storage 53 according to the first modification stores the basic texture as shown in FIG. 19.

Figure 20A:
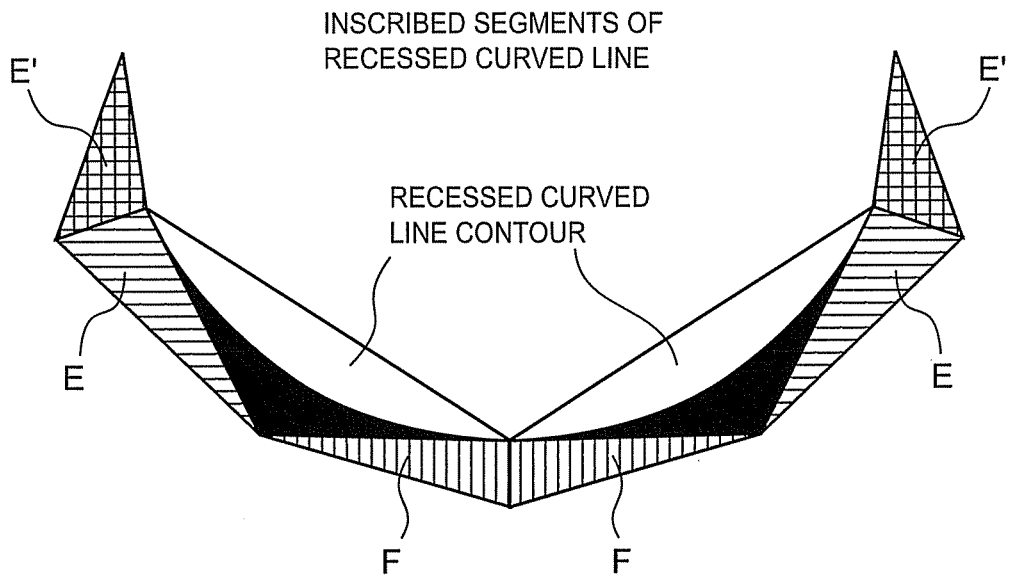
FIG. 20 is a figure illustrating an example of an inscribed segment.
Figure 20B:
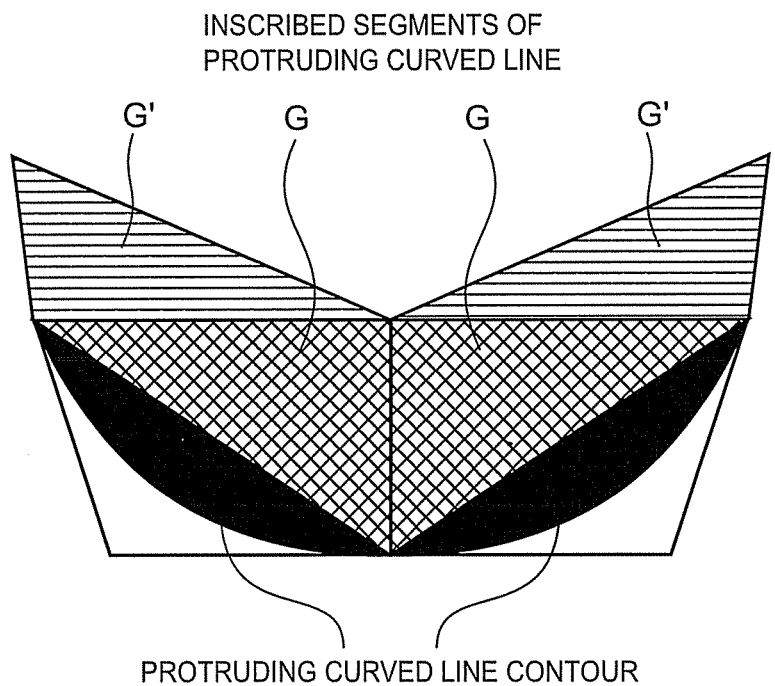

FIG. 20 is a figure illustrating an example of an inscribed segment. FIG. 20A shows inscribed segments of a recessed curved line. FIG. 20B shows inscribed segments of a protruding curved line. The third segment setter 221 analyzes the outline data, and sets a triangle group (triangles E, F, G in FIG. 13) inscribed at the connection portion between the curved line and the curved line as shown in FIG. 13 and a triangle group (triangles E', G' in FIG. 20) inscribed at a connection portion between a straight line and a curved line.

Figure 21A:
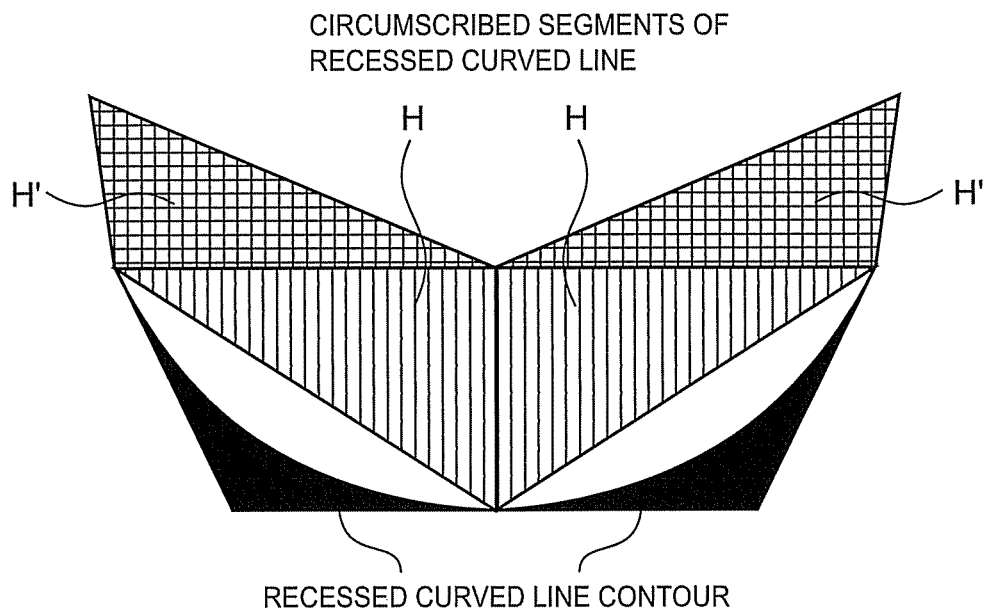
FIG. 21 is a figure illustrating an example of a circumscribed segment.
Figure 21B:
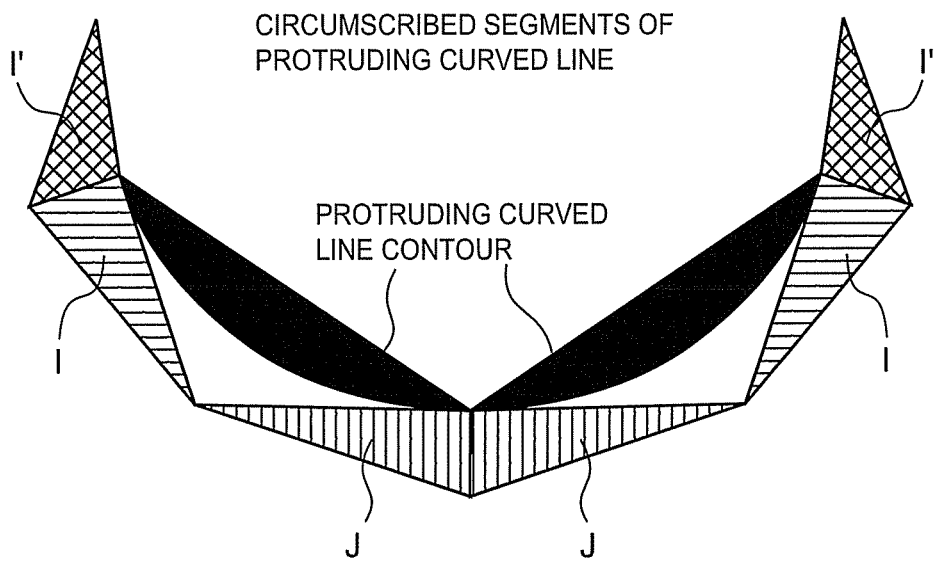

FIG. 21 is a figure illustrating an example of a circumscribed segment. FIG. 21A shows circumscribed segments of a recessed curved line. FIG. 20B shows circumscribed segments of a protruding curved line. The fourth segment setter 222 analyzes the outline data, and sets a triangle group (triangles H, I, J in FIG. 14) circumscribed at the connection portion between the curved line and the curved line as shown in FIG. 14 and a triangle group (triangles H', I' in FIG. 21) circumscribed at a connection portion between a straight line and a curved line.

The third stencil generator 231 generates stencil data corresponding to the generated inscribed segments. FIG. 22 is an explanatory diagram illustrating processing performed by a third stencil generator 231. FIG. 22A shows stencil data corresponding to the recessed curved line. FIG. 22B shows stencil data corresponding to the protruding curved line. The third stencil generator 231 cuts out triangular regions from the basic texture as shown in FIG. 19, and maps the triangular regions to the generated inscribed segments.

In other words, the third stencil generator 231 generates the stencil data corresponding to the inscribed segments by cutting out the triangular regions (triangles K, L, M, V, W, V', W') from the basic texture as shown in FIG. 19 and pasting the triangular regions to the generated inscribed segments (E, F, G, E', G'). The subsequent processings are the same as those of the present embodiment.

Figures 23A, 23B:
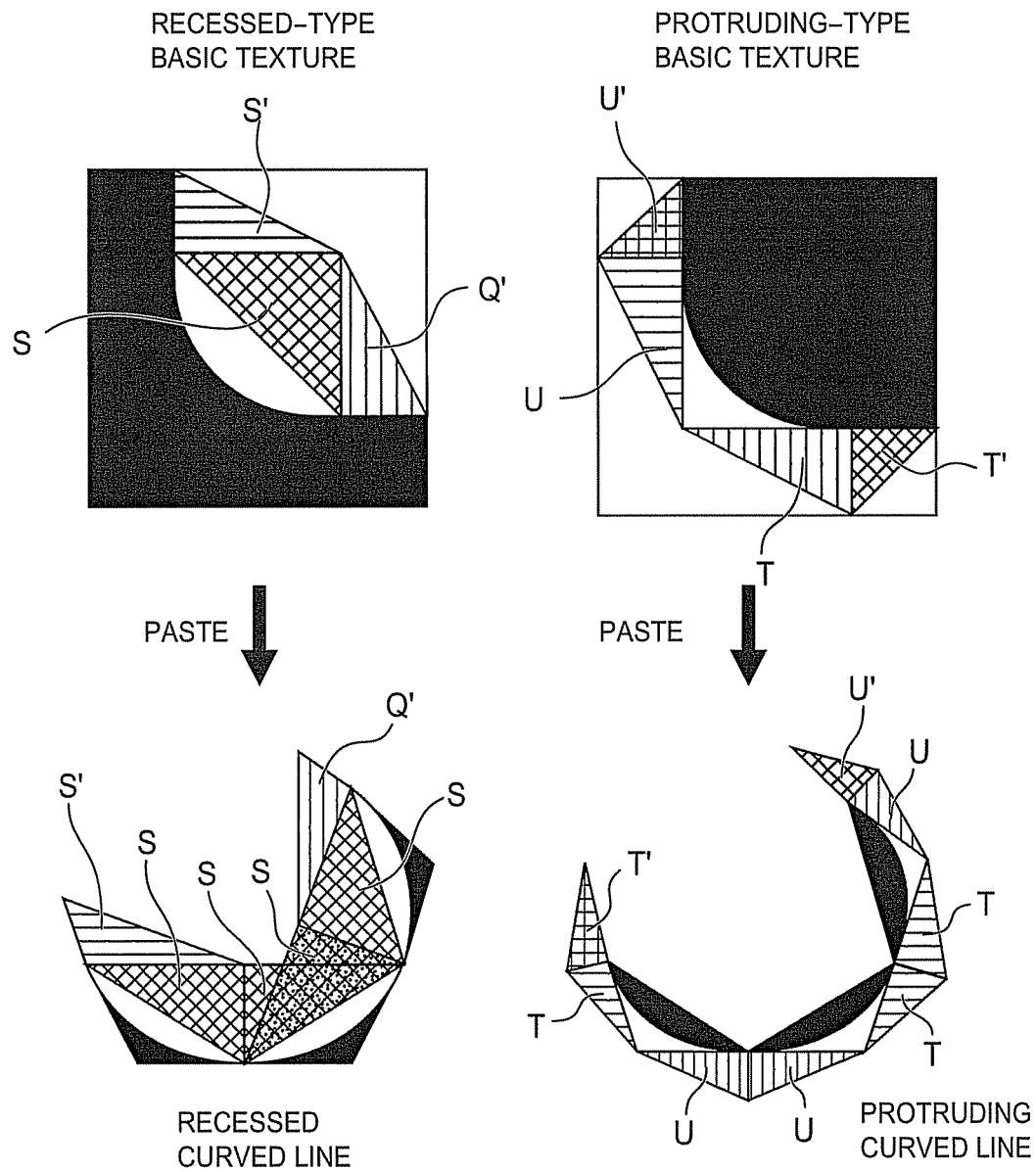
FIG. 23 is an explanatory diagram illustrating processing performed by a fourth stencil generator 232.

The fourth stencil generator 232 generates stencil data corresponding to the generated inscribed segments. FIG. 23 is an explanatory diagram illustrating processing performed by the fourth stencil generator 232. FIG. 23A shows stencil data corresponding to the recessed curved line. FIG. 23B shows stencil data corresponding to the protruding curved line. The fourth stencil generator 232 cuts out triangular regions from the basic texture as shown in FIG. 19, and maps the triangular regions to the generated circumscribed segments.

In other words, the fourth stencil generator 232 generates the stencil data corresponding to the circumscribed segments by cutting out the triangular regions (triangles S, T, U, S', Q', U', T') from the basic texture as shown in FIG. 19 and pasting the triangular regions to the generated circumscribed segments (H, I, J, H', I'). The subsequent processings are the same as those of the present embodiment.

In the first modification, not only the triangles inscribed and the triangles circumscribed at the connection portion between the curved line and the curved line but also the triangle groups inscribed and circumscribed at the connection portion between the straight line and the curved line are newly drawn, and the alpha values a in proximity to the connection section stored in the basic texture are mapped to the triangle groups. Thus, the connection section between the curved line and the straight line is continuously, smoothly connected.

(Second Modification)

Figure 24:
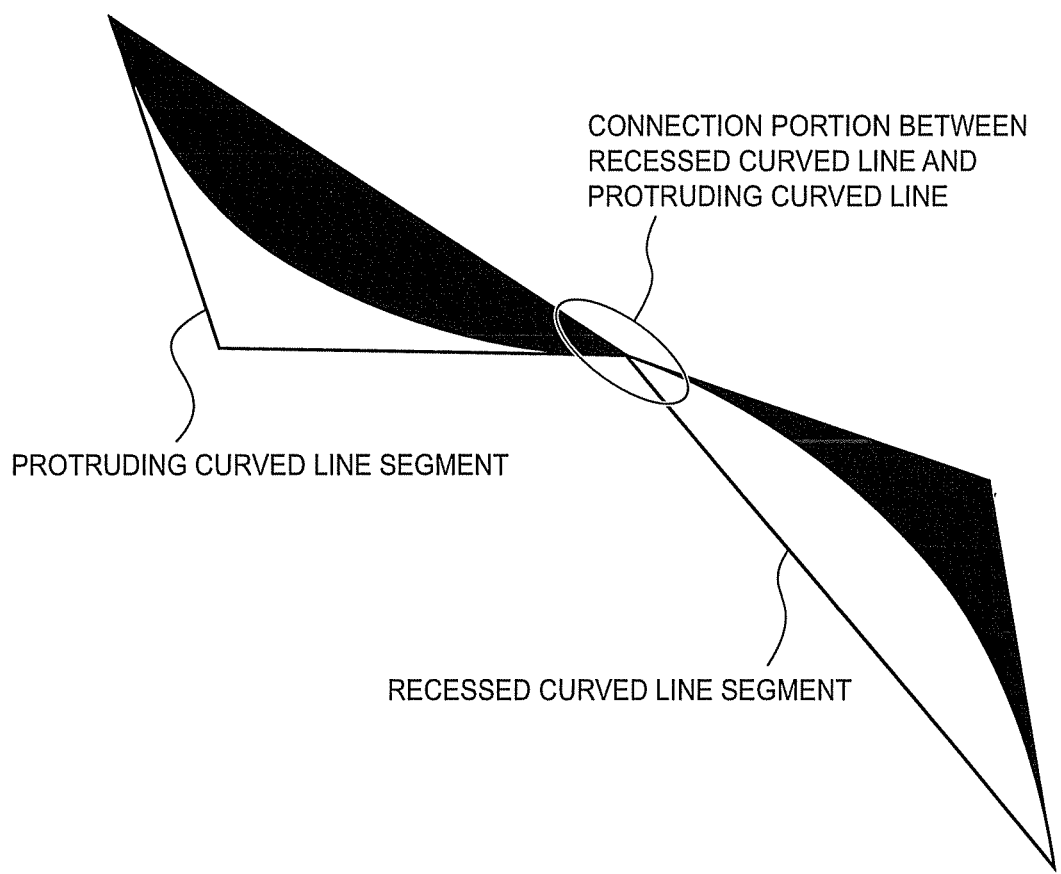
FIG. 24 is a figure illustrating an example of a drawing result of a connection portion between a recessed curved line and a protruding curved line.

FIG. 24 is a figure illustrating an example of a drawing result of a connection portion between a recessed curved line and a protruding curved line according to the above embodiment. As shown in FIG. 24, in the drawing result according to the above embodiment, a connection section between the recessed curved line and the protruding curved line (portion enclosed by a circle in FIG. 24) may not be smoothly connected and may be discontinuous. For example, a dot may be lost in the connection portion between the curved line and the straight line in the character image.

In the second modification, a texture capable of representing change of the alpha value in proximity to the connection portion between the recessed curved line and the protruding curved line is adopted as a basic texture.

Figure 25:
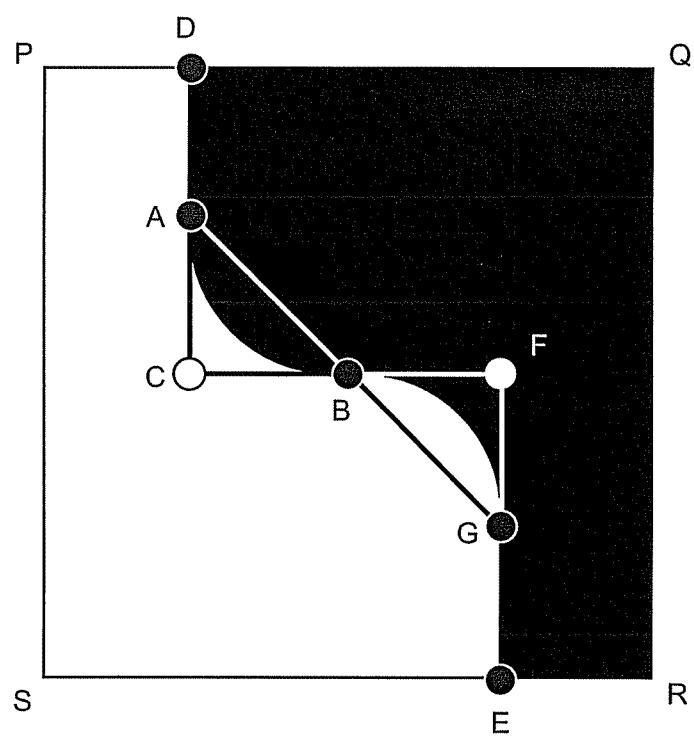
FIG. 25 is a figure illustrating an example of a basic texture according to the second modification of the second embodiment.

FIG. 25 is a figure illustrating an example of a basic texture according to the second modification. As shown in FIG. 25, the basic texture according to the second modification is an image defining variation of an alpha value a in a figure made by connecting, in a rectangle (for example, square) PQRS, (1) a straight line DA connecting between a point D on a side PQ and a point A on a line passing through the point D and being perpendicular to the side PQ, (2) a straight line EG connecting between a point E on a side RS opposite to the side PQ and a point G on a line passing through the point E and being perpendicular to the side RS, (3) a Bezier curve AB having a start point at the point A, having an end point at the center B of the rectangle PQRS, and a control point at a crossing point C between the straight line DA and a line passing through the point B and being perpendicular to the straight line DA, and (4) a Bezier curve GB having a start point at the point G, having an end point at the point B, and having a control point at a crossing point F between the straight line EG and a line passing through the point B and being perpendicular to the straight line EF. A texture storage 53 according to the second modification stores the basic texture as shown in FIG. 25. It should be noted that there is only one basic texture in the second modification.

The third stencil generator 231 cuts out triangular regions C1, D1, F1, G1, I1 as shown in FIG. 26 from the basic texture as shown in FIG. 25, and maps the triangular regions to the generated inscribed segments, thus generating stencil data corresponding to the inscribed segments. The subsequent processings are the same as those of the present embodiment.

The third stencil generator 232 cuts out triangular regions B2, D2, E2, H2, J2 as shown in FIG. 27 from the basic texture as shown in FIG. 25, and maps the triangular regions to the generated circumscribed segments, thus generating stencil data corresponding to the circumscribed segments. The subsequent processings are the same as those of the present embodiment.

In the present modification, the basic texture in which the alpha value a is defined at the connection portion between the recessed curved line and the protruding curved line is mapped to the triangles inscribed and the triangles circumscribed at the connection section portion. Thus, the connection portion between the recessed curved line and the protruding straight line is smoothly connected According to the above embodiments, the character image can be drawn with less jaggy at a low processing cost.

Several embodiments have been hereinabove explained. However, these embodiments are presented as examples, and are not intended to limit the scope of the invention. These new embodiments can be embodied in various other forms, and various kinds of omissions, replacements, and changes can be made without deviating from the gist of the invention. These embodiments and the modifications thereof are included in the scope and the gist of the invention, and are included in the invention described in the claims and the scope equivalent thereto.

The storage format of the storage medium for the above embodiments may be in any form as long as the storage medium can store programs and is a storage medium that can be read by a computer or that can be read by an embedded system, such as a magnetic disk, a flexible disk, a hard disk, an optical disk (a CD-ROM, a CD-R, a DVD, and the like), magneto optical disk (an MO and the like), a semiconductor memory, and the like.

An OS (operating system), a MW (middleware) such as database management software, network software, and the like, which runs on a computer, may execute some of the processes for achieving the above embodiments on the basis of instructions in the program which is installed from a storage medium to the computer and the embedded system.

What is claimed is:

1. A drawing apparatus comprising:
a segment setter configured to analyze outline data, to set a straight line segment for drawing a straight line portion and a curved line segment for drawing a curved line portion, in the outline data, and to set inscribed segments or circumscribed segments to at least one of a connection portion between two curved line portions and a connection portion between the straight line portion and the curved line portion;
a first stencil generator configured to generate stencil data of the straight line segment;
a second stencil generator configured to obtain a basic texture in which transparency is allocated for each of a plurality of regions in the basic texture to paste a portion of the basic texture to the curved line segment in accordance with a shape of the curved line segment, and to generate stencil data of the curved line segment,
wherein the portion of the basic texture corresponding to each of the inscribed segments or each of the circumscribed segments being pasted to the corresponding segment; and
a drawer configured to draw a character image corresponding to the outline data, based on the stencil data of the straight line segment and the stencil data of the curved line segment.

2. The drawing apparatus according to claim 1,
wherein in the basic texture, the transparency continuously changes from a completely transparent region to a non-transparent region.

3. The drawing apparatus according to claim 2, further comprising:
a texture storage configured to store the basic texture,
wherein the basic texture is an image defining the transparency of a region enclosed by a Bezier curve having a start point at a middle point A of a side of a rectangle, having an end point at a middle point B of another side crossing the side, and having a control point at a central point C of the rectangle.

4. The drawing apparatus according to claim 2, further comprising:
a texture storage configured to store the basic texture,
wherein the basic texture is an image defining the transparency of a figure made by connecting, in a rectangle, (1) a straight line DA connecting between a point D on a side and a point A on a line passing through the point D and being perpendicular to the side, (2) a straight line EB connecting between a point E on another side crossing the side and a point B on a line passing through the point E and being perpendicular to the another side, and (3) a Bezier curve AB having a start point at the point A, having an end point at the point B, and having a control point at a crossing point C between the straight line DA and the straight line EB.

5. The drawing apparatus according to claim 2, further comprising:
a texture storage configured to store the basic texture,
wherein the basic texture is an image defining the transparency of a figure made by connecting, in a rectangle, (1) a straight line DA connecting between a point D on a side and a point A on a line passing through the point D and being perpendicular to the side, (2) a straight line EG connecting between a point E on a side opposite to the side and a point G on a line passing through the point E and being perpendicular to the opposite side, (3) a Bezier curve AB having a start point at the point A, having an end point at a center B of the rectangle, and a control point at a crossing point C between the straight line DA and a line passing through the point B and being perpendicular to the straight line DA, and (4) a Bezier curve GB having a start point at the point G, having an end point at the point B, and having a control point at a crossing point F between the straight line EG and a line passing through the point B and being perpendicular to the straight line EF.

6. The drawing apparatus according to claim 2, further comprising:
a second segment setter configured to generate a contact point segment of a drawing region adjacent to at least one of a connection point of two curved line segments to be connected and a connection point of a curved line segment and a straight line segment to be connected; and a third stencil generator configured to paste a portion of the basic texture to the contact point segment in accordance with a shape of the curved line segment, and to perform bitwise-inversion on the curved line segment on which the portion of the basic texture is mapped, and to generate stencil data of the curved line segment.

7. A drawing method comprising the steps of:

analyzing, by a computer to which a program is installed, outline data;

setting, by the computer, a straight line segment for drawing a straight line portion and a curved line segment for drawing a curved line portion, in the outline data;

setting, by the computer, inscribed segments or circumscribed segments to at least one of a connection portion between two curved line portions and a connection portion between the straight line portion and the curved line portion;

generating, by the computer, stencil data of the straight line segment;

obtaining, by the computer, a basic texture in which transparency is allocated for each of a plurality of regions in the basic texture, pasting, by the computer, a portion of the basic texture to the curved line segment in accordance with a shape of the curved line segment;

wherein the portion of the basic texture corresponding to each of the inscribed segments or each of the circumscribed segments being pasted to the corresponding segment;

generating, by the computer, stencil data of the curved line segment; and drawing, by the computer, a character image corresponding to the outline data, based on the stencil data of the straight line segment and the stencil data of the curved line segment.

8. The drawing method according to claim 7, wherein in the basic texture, the transparency continuously changes from a completely transparent region to a non-transparent region.

9. The drawing method according to claim 8, further comprising:

storing the basic texture in a texture storage, wherein the basic texture is an image defining the transparency of a region enclosed by a Bezier curve having a start point at a middle point A of a side of a rectangle, having an end point at a middle point B of another side crossing the side, and having a control point at a central point C of the rectangle.

10. The drawing method according to claim 8, further comprising:

storing, by the computer, the basic texture in a texture storage, wherein the basic texture is an image defining the transparency of a figure made by connecting, in a rectangle, (1) a straight line DA connecting between a point D on a side and a point A on a line passing through the point D and being perpendicular to the side, (2) a straight line EB connecting between a point E on another side crossing the side and a point B on a line passing through the point E and being perpendicular to the another side, and (3) a Bezier curve AB having a start point at the point A, having an end point at the point B, and having a control point at a crossing point C between the straight line DA and the straight line EB.

11. The drawing method according to claim 8, further comprising:

storing, by the computer, the basic texture in a texture storage, wherein the basic texture is an image defining the transparency of a figure made by connecting, in a rectangle, (1) a straight line DA connecting between a point D on a side and a point A on a line passing through the point D and being perpendicular to the side, (2) a straight line EG connecting between a point E on a side opposite to the side and a point G on a line passing through the point E and being perpendicular to the opposite side, (3) a Bezier curve AB having a start point at the point A, having an end point at a center B of the rectangle, and a control point at a crossing point C between the straight line DA and a line passing through the point B and being perpendicular to the straight line DA, and (4) a Bezier curve GB having a start point at the point G, having an end point at the point B, and having a control point at a crossing point F between the straight line EG and a line passing through the point B and being perpendicular to the straight line EF.

12. The drawing method according to claim 8, further comprising:

generating, by the computer, a contact point segment of a drawing region adjacent to at least one of a connection point of two curved line segments to be connected and a connection point of a curved line segment and a straight line segment to be connected; and pasting, by the computer, a portion of the basic texture to the contact point segment in accordance with a shape of the curved line segment;

performing, by the computer, bitwise-inversion on the curved line segment on which the portion of the basic texture is mapped; and generating, by the computer, stencil data of the curved line segment.

13. A non-transitory computer readable medium storing programs that are executable by a computer, and upon such execution cause the computer to function as:

means for analyzing input outline data;

means for setting a straight line segment for drawing a straight line portion in the outline data, and setting inscribed segments or circumscribed segments to at least one of a connection portion between two curved line portions and a connection portion between the straight line portion and the curved line portion;

means for analyzing the outline data, and setting a curved line segment for drawing a curved line portion in the outline data;

means for generating stencil data of the straight line segment;

means for obtaining a basic texture in which transparency is allocated for each of a plurality of regions in the basic texture, means for pasting a portion of the basic texture to the curved line segment in accordance with a shape of the curved line segment;

wherein the portion of the basic texture corresponding to each of the inscribed segments or each of the circumscribed segments being pasted to the corresponding segment;

means for generating stencil data of the curved line segment; and means for drawing a character image corresponding to the outline data, based on the stencil data of the straight line segment and the stencil data of the curved line segment.

14. The non-transitory computer readable medium according to claim 13,
wherein in the basic texture, the transparency continuously changes from a completely transparent region to a non-transparent region.

15. The drawing program according to claim 14, further comprising:
means for storing the basic texture,
wherein the basic texture is an image defining the transparency of a region enclosed by a Bezier curve having a start point at a middle point A of a side of a rectangle, having an end point at a middle point B of another side crossing the side, and having a control point at a central point C of the rectangle.

16. The non-transitory computer readable medium according to claim 14, further comprising:
means for storing the basic texture,
wherein the basic texture is an image defining the transparency of a figure made by connecting, in a rectangle, (1) a straight line DA connecting between a point D on a side and a point A on a line passing through the point D and being perpendicular to the side, (2) a straight line EB connecting between a point E on another side crossing the side and a point B on a line passing through the point E and being perpendicular to the another side, and (3) a Bezier curve AB having a start point at the point A, having an end point at the point B, and having a control point at a crossing point C between the straight line DA and the straight line EB.

17. The non-transitory computer readable medium according to claim 14, further comprising:
means for generating a contact point segment of a drawing region adjacent to at least one of a connection point of two curved line segments to be connected and a connection point of a curved line segment and a straight line segment to be connected; and
means for pasting a portion of the basic texture to the contact point segment in accordance with a shape of the curved line segment;
means for performing bitwise-inversion on the curved line segment on which the portion of the basic texture is mapped; and
means for generating stencil data of the curved line segment.

18. The non-transitory computer readable medium according to claim 14, further comprising:
means for storing the basic texture in a texture storage,
wherein the basic texture is an image defining the transparency of a figure made by connecting, in a rectangle, (1) a straight line DA connecting between a point D on a side and a point A on a line passing through the point D and being perpendicular to the side, (2) a straight line EG connecting between a point E on a side opposite to the side and a point G on a line passing through the point E and being perpendicular to the opposite side, (3) a Bezier curve AB having a start point at the point A, having an end point at a center B of the rectangle, and a control point at a crossing point C between the straight line DA and a line passing through the point B and being perpendicular to the straight line DA, and (4) a Bezier curve GB having a start point at the point G, having an end point at the point B, and having a control point at a crossing point F between the straight line EG and a line passing through the point B and being perpendicular to the straight line EF.

* * * * *